United States Patent [19]

Leonhardt et al.

[11] Patent Number: 5,485,321
[45] Date of Patent: Jan. 16, 1996

[54] FORMAT AND METHOD FOR RECORDING OPTIMIZATION

[75] Inventors: Michael L. Leonhardt, Longmont; Charles A. Milligan, Golden, both of Colo.

[73] Assignee: Storage Technology Corporation, Louisville, Colo.

[21] Appl. No.: 176,162

[22] Filed: Dec. 29, 1993

[51] Int. Cl.⁶ .............................. G11B 5/09; G11B 15/12
[52] U.S. Cl. .................................................. 360/48; 360/61
[58] Field of Search .................... 360/61, 48, 32, 360/63, 77.08, 40, 49; 369/59, 124

[56] References Cited

U.S. PATENT DOCUMENTS

| | | | |
|---|---|---|---|
| 3,916,440 | 10/1975 | Irwin | 360/50 |
| 4,539,605 | 9/1985 | Hoshino et al. | 360/48 X |
| 4,646,170 | 2/1987 | Kobayashi et al. | 360/48 X |
| 5,270,877 | 12/1993 | Fukushima et al. | 360/48 |
| 5,272,691 | 12/1993 | Watanabe | 360/48 X |
| 5,274,510 | 12/1993 | Sugita et al. | 360/48 X |
| 5,274,772 | 12/1993 | Dunn et al. | 360/48 X |
| 5,325,239 | 6/1994 | Hoogendoorn et al. | 360/48 X |

OTHER PUBLICATIONS

American National Standards Institute, "ANSI for Recorded Magnetic Tape for Information Interchange (800 CPI, NRZI)" Aug. 1983 pp. 6–14.
American National Standard Institute, "ANSI for Recorded Magnetic Tape for Information Interchange (1600 CPI, Phase Encoded)", Jan. 1986, pp. 7–14.

*Primary Examiner*—Donald Hajec
*Assistant Examiner*—Thien Minh Le
*Attorney, Agent, or Firm*—Eugene H. Valet

[57] ABSTRACT

A performance optimized computer data recording media format and associated control logic method is disclosed. Localized data block recording, such as by concurrent parallel or serpentine recording techniques, is used to create a series of Virtual Volumes on a single physical volume. Physical localization of data blocks records is achieved which tends to minimize access time. Using the Virtual Volume construct, other industry standard data storage systems can be emulated. Many data storage operations requesting physical motion are translated into virtual motion which in turn results in significantly less physical motion than that requested, thereby reducing access times and media and drive apparatus wear.

43 Claims, 20 Drawing Sheets

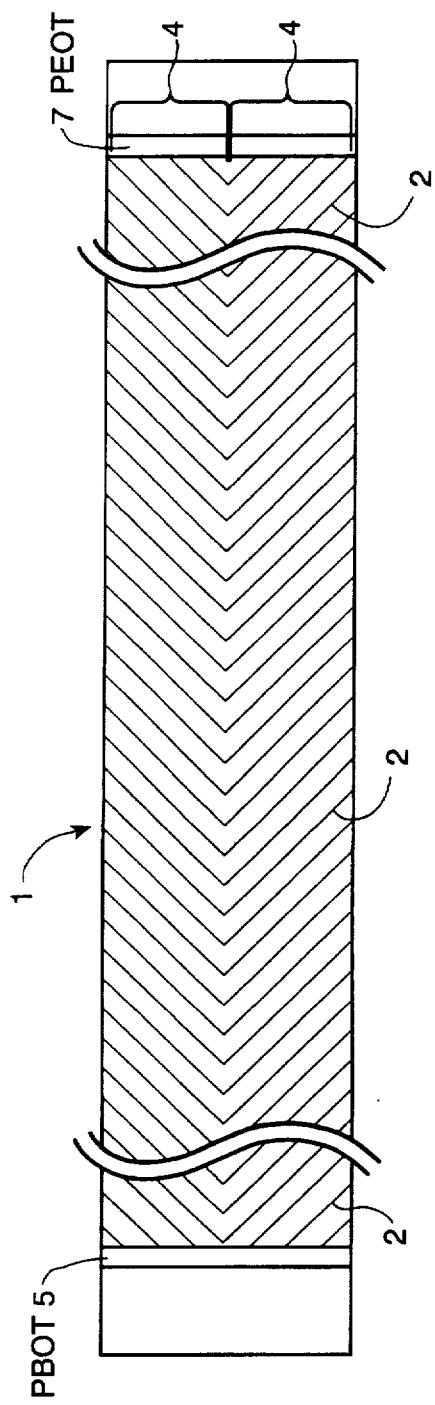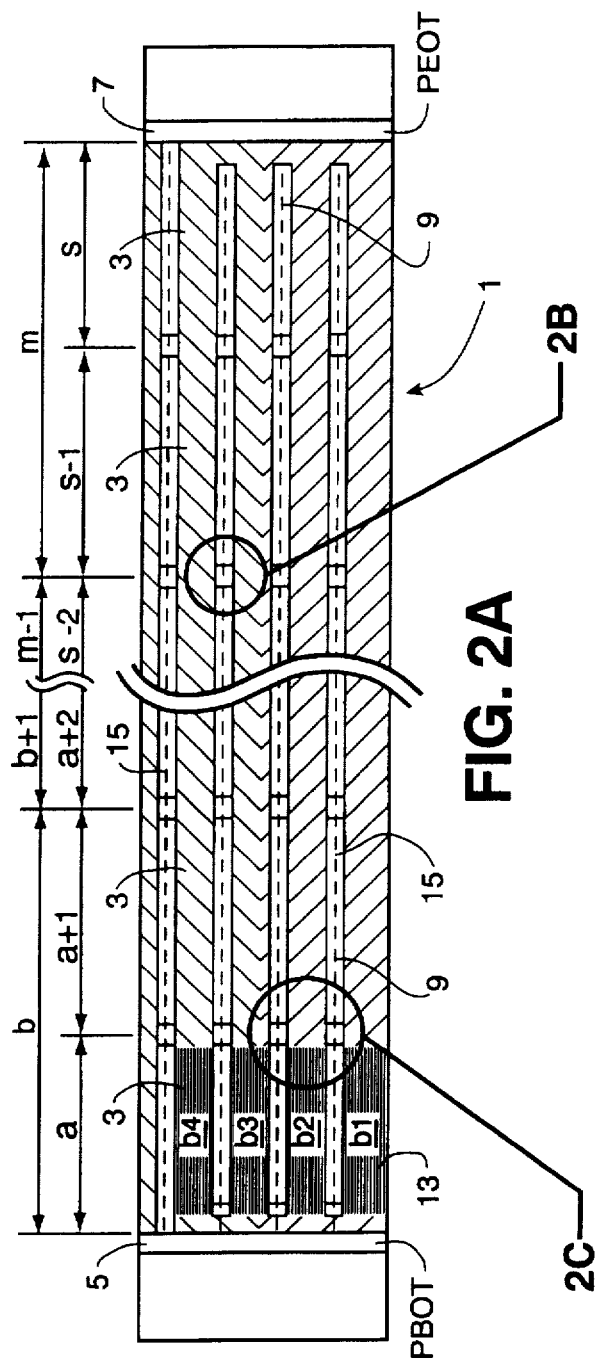

TABLE 2

FOR $SG_{g_1, g_2, \ldots g_n}$      $n = 2$, i.e., LONGITUDINAL AND CROSSWIDTH

| | |
|---|---|
| $MAU = GAU_0 = SG_{0,0}$<br>MINIMUM PHYSICALLY ADDRESSABLE UNIT | BOUNDED BY SEGMENT AND SERVO LIMITS |
| $GAU_1 = SG_{1,0}$<br>MINIMUM LOGICALLY ADDRESSABLE UNIT | BOUNDED BY SECTOR AND SERVO LIMITS |
| $GAU_2 = SG_{2,2}$<br>AREA OF TAPE FOR VIRTUAL VOLUME $X \Rightarrow$ MULTI $GAU_1$ | BOUNDED BY MULTI-SECTORS AND FULL CROSSWIDTH |
| $GAU'_2 = SG_{2,2}$<br>AREA OF TAPE FOR VIRTUAL VOLUME $X' \Rightarrow$ MULTI $GAU_1$ | BOUNDED BY MULTI-SECTORS AND FULL CROSSWIDTH |
| $GAU_3 = SG_{3,2}$<br>PORTION OF TAPE USED IN FULL FILL MODE COMPOSED OF MULTI $GAU_2$ | BOUNDED BY MULTI-SECTORS AND FULL CROSSWIDTH |
| $GAU'_3 = SG_{3,2}$<br>PORTION OF TAPE USED IN FULL FILL MODE COMPOSED OF MULTI $GAU'_2$ | BOUNDED BY MULTI-SECTORS AND FULL CROSSWIDTH |

NOTE: FILL MODE means: that set of rules for sequencing the selection of $GAU_1$ in longitudinal and crosswidth dimensions; for this example, it could be: Full width, $\frac{1}{4} - \frac{3}{4}$ width, or half width fill mode. The general form is RD2 - crosswidth a2 = number of servo domains. Fill mode options: $\frac{a_2}{a_2}$, Full Fill i.e., $\frac{a_2-1}{a_2}, \frac{a_2-2}{a_2}, \ldots, \frac{a_2 - \frac{1}{2}a_2}{a_2}$ i.e., $\frac{1}{2}$ Fill, $\frac{a_2-K}{a_2}, \ldots, \frac{1}{a_2}$

FIG. 1B

TABLE 1

Domain Definitions

Physical Recording Domain ⇒ Region where subsystem and host computer data can be potentially recorded.

e.g. Tape=Full width from physical beginning to physical end of recording medium on the substrate.

Disk=Full extent of recording medium on the recording substrate.

Logical Recording Domain ⇒ Region where data can be recorded as constrained by formatting.

e.g. Tape=Within track boundaries from the BOT to the EOT markers.

Disk=e.g. FBA:
Within bounds of each sector on each concentric track from innermost to outermost, plus those areas used by the subsystem for directories and spares. Spiral track disk = equivalent to a tape image.

Servo Domain ⇒ Region over which data element positioning is controlled by a particular servo position reference feature. (See 14 on Fig. 2C)

e.g. Tape=region bounded longitudinally by PBOT and PEOT and further bounded transversely by the maximum physical distance between servo track and data track over which track following tolerances can be maintained.

Disk=A concentric band (near-concentric for spiral tracks) whose width is bounded by the maximum distance between servo track and data track over which track following tolerances can be maintained.

FIG. 1C-1

New Architecture

Virtual Volume Domain for Virtual Tape$_i$ ⇒ GAU1(i-1) LBOT$_i$ › LEOT$_i$ for i=1›n When n = 1
    Then:    Virtual tape=Physical Tape and LBOT$_1$ = LBOT
                Reflection points are LBOT$_1$ & LEOT$_1$, LEOT$_1$ = LEOT When n > 1
    Then:    Virtual Tape < Physical Tape
                Reflection points are LBOT$_i$ & LEOT$_i$
                LBOT$_1$ = LBOT  LEOT$_n$ = LEOT Reflection point is - Full Fill Mode ›  Where one must rewind from and in order to continue writing

- Half Fill Mode ›  Where one must wrap i.e. move to the other half of the data domain and continue writing in Reverse direction.

VBOT$_i$/VEOT$_i$ pair ›  Markers allowed to move within bounds of the virtual volume domain for volume i.e. LBOT$_i$ › LEOT$_i$ that further define the current instance of the beginning of the Virtual Volume recording (i.e. VEOT) and the end of the Virtual Volume recording extent and there demark valid data from "old data," (i.e. recorded in some previous use of this Virtual Volume)

FIG. 1C-2

TABLE 3

Rules for sequencing $GAU_1$ to compose $GAU_2'$ (i.e. Full Width Write Mode Virtual Volume)

1. Start at next $GAU_1$ positioned at lower edge of tape on PEOT side of segment/sector marker identified as LBOT, mark as VBOT. Fill and go to Step 2. Beyond this point if this $GAU_1$ is re-selected, mark previous $GAU_1$ as VEOT and respond to system--virtual volume is Full, end of data writing unless instructed to overwrite (e.g. by Rewind and write commands.)

2. Select next $GAU_1$ between last $GAU_1$ and upper edge of tape until none exist then go to step 3.

3. Select $GAU_1$ positioned at lower edge of tape on PEOT side of previous $GAU_1$ selected (unless beyond (i.e. it is on PEOT side of) segment/sector marker identified as LEOT i.e. reflection point). Fill $GAU_1$ and go to step 2. If beyond LEOT marker go to step 4.

4. Rewind tape to LBOT marker and select first $GAU_1$ at lower edge of tape on PEOT side of LBOT marker. Fill and go to step 2.

FIG. 4A

TABLE 4

Rules for sequencing $GAU_1$ to compose $GAU_2$ (i.e. Half Width Write Mode Virtual Volume)

1. Start at next $GAU_1$ positioned at lower edge of tape on PEOT side of segment/sector marker identified as LBOT, mark as VBOT. Fill and go to step 2. Beyond this point if this $GAU_1$ is re-selected, mark previous $GAU_1$ as VEOT and respond--Virtual Volume is full, end of data writing unless instructed to overwrite. (e.g. by getting rewind and write commands.)

2. Select next $GAU_1$ between last $GAU_1$ and center line (Primary header, pointer domain) until none exist. Then go to step 3.

3. Select next $GAU_1$ positioned at lower edge of tape on PEOT side of previous $GAU_1$ selected (unless beyond (i.e. it is on PEOT side of) segment/sector marker identified as LEOT i.e. reflection point). Fill $GAU_1$ and go to step 2. If beyond LEOT marker go to step 4.

4. Select $GAU_1$ positioned at upper edge of tape on PBOT side of segment/sector marker identified as LEOT. Fill and go to step 5.

5. Select next $GAU_1$ between $GAU_1$ selected in step 4 and center line of tape until none exist. Then go to step 6.

6. Select $GAU_1$ positioned at upper edge of tape on PBOT side of previous $GAU_1$ selected (unless beyond, i.e. on the PBOT side of segment/sector marker identified as LBOT i.e. reflection point). Fill $GAU_1$ and go to step 5. If beyond LBOT marker go to step 7.

7. Select first $GAU_1$ positioned at lower edge of tape on PEOT side of LBOT marker. Fill and go to step 2.

FIG. 4B

TABLE 5

General Rules for sequencing $GAU_1$ to compose $GAU_2'_i$ (i.e. < half (e.g. $\frac{1}{a_2}$) Fill Virtual Volume)*

1. Start at $GAU_1$ positioned at lower edge of tape beginning with next segment/sector marker that is on PEOT side of segment/sector marker identified as LBOT, mark as VBOT. Fill and go to step 2. Beyond this point if this $GAU_1$ is re-selected. Go to step 8.

2. Select next $GAU_1$ between last $GAU_1$ and next calculated upper boundary $\left[ \text{e.g.} \frac{a_2 - k}{a_2} \text{ where } k < a_2 \right]$ until none exist, then go to step 3.

3. Select $GAU_1$ positioned at lower edge of tape on PEOT side of previous $GAU_1$ selected (unless beyond (i.e. it is on PEOT side of) segment/sector marker identified as LEOT i.e. reflection point). Fill $GAU_1$ and go to step 2. If beyond LEOT marker go to step 4.

4. Select $GAU_1$ positioned at upper edge of tape on PBOT side of segment/sector marker identified as LEOT. Fill and go to step 5.

5. Select next $GAU_1$ between $GAU_1$ selected in step 4 and next calculated boundary as in step 2 until none exist, then go to step 6.

6. Select $GAU_1$ positioned at upper edge of tape on PBOT side of previous $GAU_1$ selected (unless beyond, i.e. on the PBOT side of, segment/sector marker identified as LBOT i.e. reflection point). Fill $GAU_1$ and go to step 5. If beyond LBOT marker go to step 7.

7. Select first $GAU_1$ positioned at lower edge of tape on PEOT side of LBOT marker. Fill and go to step 2.

8. Redefine upper and lower edge to be area between the areas written in steps 1-6. If no GAU exists between upper and lower edges of tape, go to step 10, or go to step 9.

FIG. 4C-1

9. Select next $GAU_1$ positioned at lower edge of tape on PEOT side of LBOT marker. Fill and go to step 2.

10. Mark previous $GAU_1$ as VEOT and respond to system--Virtual Volume is Full, end of data writing unless instructed to overwrite (e.g. by rewind and write commands.)

\* Note on table 5: This set of rules fills from the "edges" of the tape to the center. Other fill patterns can be used when preferred (e.g. from one edge to the other (i.e. bottom to top) or bottom to center then top to center); the rules are permutations apparent to those skilled in the art.

FIG. 4C-2

TABLE 6

NATIVE WRITE MODES — READ ONLY — WRITE ONCE, APPEND AT THE END

PERMANENT — LIKE CURRENT TAPE

SCRATCH — ALLOWS OVERWRITE WHEN TAPE IS FULL, RESETS $VBOT_i$ ON LOAD OR MOVES IT AS FULL TAPE IS APPENDED

| DATA CLASSIFICATIONS | VALID | NOT VALID |
|---|---|---|
| INTEGRITY | WHOLE FILES $VBOT_i - EOD_i$ | WHOLE FILES $EOD_i - VEOT_i$ |
| LOSS OF INTEGRITY | PARTIALLY OVERWRITTEN FILES $VBOT_i - EOD_i$ | PARTIALLY OVERWRITTEN FILES $VBOT_i - EOD_i$ |

WHERE FILE = $GAU_i$ MEDIA SPACE SUBSET

FIG. 10A

FORMAT AND METHOD FOR RECORDING OPTIMIZATION

BACKGROUND OF THE INVENTION

1. Field of the Invention

The present invention relates generally to computer data storage and retrieval, and more particularly, to recording media format structures and the associated control logic process for recording and retrieving data with said format structures. More specifically, the present invention relates to data recording in such a manner as to organize data blocks into constructs that optimize performance criteria.

2. Description of the Related Art

From the start, digital computers have required some form of data storage to augment the relatively sparse main memory facilities. Magnetic and optical recording media provides such non-main memory storage means in the state of the art. Many forms of recording media drives, using technologies such as cassettes or cartridges, reel-to-reel tape, digital audio tape, eight millimeter tape, magneto-optical and optical disks, flash RAM, and other media, are now available in the market.

A goal of data storage and retrieval technology developers is to maximize the defining of units of readily accessible and identifiable, or "addressable," blocks of recorded information (which may be an application or utility computer program, modules, user data, or the like, collectively referred to hereinafter as "data").

For example, personal computers are generally equipped with a floppy disk controller printed circuit board and disk drive for retrieval (e.g., loading software onto the hard disk main memory of the computer) or storage (namely, hard disk backup or archiving of data). However, floppy disk capacity is limited in the state of the art to approximately twenty-one megabytes per 3½ inch form factor diskette. With common personal computers having a hard drive of more than two-hundred megabytes, the use of floppy disks for data back UP or archiving is impractical. Therefore, other recording machines such as magnetic tape and optical disk have been developed and are increasing in popularity.

Magnetic tape devices have found popularity as fast, efficient, and economical means for storing computer data. Tapes are used primarily for such tasks as routine back up of a hard disk and for off-line file management tasks routinely implemented between a computer hard disk memory and tape as data is processed.

Streaming tape drives (also referred to as "streamers") operate similarly to disk drives in that they are constant speed transports for storing data from computers, that is, once started, the drive moves the tape from its physical beginning to its physical end, or vice versa, whether or not there is data to record. Data is transferred to a drive apparatus which uses a cartridge or cassette containing the recording medium. Streaming drives generally record unidirectionally, laying down as many parallel tracks as tape, head, and drive electronics technology will permit. However, some streamers are capable of writing bidirectionally; upon reaching the defined end of the media, the drive selects a different set of tracks, reverses the relative motion of the medium with respect to the head, and writes on the newly selected set of tracks. This method is known in the art as "serpentine recording." Thus, the conventional serpentine recording format schemes write data in a single, lengthy data stream on multiple tracks along the full length of the tape. Magnetic tape media in a cartridge such as that set forth in the ANSI X3.55-1992 Standard or U.S. Pat. No. 3,692,255, Belt Drive Tape Cartridge (incorporated herein by reference), used in such recording is adaptable for use with the present invention.

A general description of computer tape drive technology can be found in the book STREAMING, Copyright 1982, Archive Corporation, Library of Congress Catalog No. 82-072125, incorporated herein by reference. Industry standards for recording with streamers on ¼-inch wide magnetic tape are promulgated by the Quarter Inch Cartridge ("QIC") Committee and are commonly referred to as "QIC Standards."

Various modes of recording using such drives have been created, for example, longitudinal (stop-start or back-hitch recording), helical scanning, and streaming. One example of a serpentine mode recording, streaming tape drive that provides an alternative recording mode is disclosed by Precourt in U.S. Pat. No. 5,541,019, Recording System for Recording Data on Tape in a Disk-Recording Format. Precourt discloses an apparatus in which the elements of a floppy disk format (that is, circular disk tracks and sectors that comprise a disk track, known in the art as Fixed Block Architecture disk format) are imposed on a data stream sent to a serpentine recording tape drive. In general, the command set for disk recording is interpreted to give the appearance that data recorded on tape is recorded on a magnetic disk by using the floppy disk controller. As shown in FIG. 5 of Precourt, the stream of data presented to the tape drive is divided into records called segments. Each recorded segment 120 includes a first fill field 121, followed by a predetermined number of fields called sectors 1, 2 . . . n, including identifying addresses and data, followed by a second fill field 122 until an end-of-segment index pulse is provided by a controlling microprocessor to the host. The segment length in the data stream is equivalent to the number of data bytes necessary to store the data that defines the length of a concentric track on a floppy disk. Thus, Precourt teaches manipulation of a stream of data presented to a serpentine recording tape drive emulating a floppy disk drive, but does not address the definition of the actual data format for a tape or disk drive nor provide improved constructs that optimize performance criteria.

A more common means used in QIC streaming tape drives for tracking and retrieving data once it is recorded is disclosed by Mintzlaff in U.S. Pat. No. 4,858,039, Streaming Tape Drive With Direct Block Addressability. By calculating the difference between the address of the current data bock at the read-write head and the address of the desired data block address on the tape, a control algorithm steps directly to the desired serpentine track and then streams to the desired data block. Thus, data block access time is reduced from a strictly serial search of the tape to a process of stepping to the desired track and then performing a serial search of that track for the desired data block. Again, Mintzlaff's invention does not address the subject of the current invention which is used to define the actual media format for a tape or disk drive nor provide the accompanying advantages.

While removable recording media has the desirable characteristic of being inexpensive enough to store large data bases in their entirety, it is also limited in application due to the latencies (defined by the McGraw-Hill Dictionary of Scientific and Technical Terms, 4th Ed., copr. 1989 as: "[COMPUT SCI] The waiting time between the order to read/write some information from/to a specified place and the beginning of the data-read/write operation") associated with media handling and positioning. Such latencies can limit storage and retrieval job throughput. These latencies include mechanical related factors, such as loading and unloading the media, seeking, serial bock searching, rewinding, or system related timing factors such as media initialization, directory searching, or file label reading.

Therefore, there is a need for a recording technique that provides higher performance for the host computer.

SUMMARY OF THE INVENTION

In its basic aspects, the present invention comprises a data storage method for linearly recording data blocks on a physical media, having at least one physical recording domain having at least one logical recording domain, said logical recording domains structured within "n" recording dimensions (where "n"=an integer 1 through "n"), including at least a cross-width dimension and a longitudinal length dimension of said physical recording domain. The method comprising demarcating the "n" longitudinal dimensions of the logical recording domain into "$a_i$" number of segments (where "i"=an integer 1 through "n"), where "a" is an integer greater than or equal to 1; partitioning the logical recording domain and grouping sets of minimum allocation units comprising "$j_i$" the segments (where "$j_i$" is an integer greater than or equal to one and less than or equal to "$a_i$") across each "n" dimension of the logical recording domain into "b" number of group allocation units, where "b" is an integer greater than or equal to 1, each group allocation unit having "c" number of concurrent recording tracks, where "c" is an integer greater than or equal to 1; and recording, beginning at any position within the logical recording domain, a collection of related data blocks on the recording tracks within a sequence of one or more group allocation units, such that each length of media recorded with each collection of data blocks defines a subset of a virtual media, and each physical media comprises "d" number of virtual media, where "d" is an integer greater than or equal to one.

In an exemplary embodiment, the basic aspects of the invention comprise a tape drive operational process of demarcating a tape recording domain into "a" longitudinal data recording segments, where "a" is an integer greater than one, spaced longitudinally along the entire length of the recording domain to define segments of the domain; demarcating the tape across the recording domain cross-width into "b" cross-width data segments, where "b" is an integer greater than or equal to one; partitioning the segments into allocation units; writing within an allocation unit an index marker to mark a virtual beginning of tape position within the allocation unit; recording a collection of data blocks received from the host computer via the interface in a sequence of one or more allocation units in a serpentine recording mode following the virtual beginning of tape index marker until the collection of data blocks has been fully recorded; and writing a virtual end of tape index marker following the collection of data blocks. In this manner, by repeating the virtual tape recording and index marking steps until all allocation units have been filled, each tape so recorded defines a number, "d," of Virtual Tape Volumes, where "d" equals the number of collections of data blocks bounded by a pair of virtual beginning of tape index and a virtual end of tape index markers.

It is an advantage of the present invention that it provides an easily employed data storage structure that enables development of broad control logic processes for substantially conventional recording media drive mechanisms.

It is an advantage of the present invention that it reduces stored data access time for a host computer.

It is another advantage of the present invention that it optimizes data recording performance by providing constructs to organize the dimensions on the medium required for a given amount of data stored.

It is yet another advantage of the present invention that it provides a recording method that reduces complexity and wear in the drive mechanism, recording head elements, and media.

It is still another advantage of the present invention that it provides a method that is easily made compatible with industry standard recording protocols, thus enabling emulation of standard drives and preserving the host computer's investment in commercial software.

It is a further advantage of the present invention that it provides additional features to enhance volume management software functions.

Another advantage of the present invention is that it reduces the amount of physical positioning that occurs between the head(s) and the medium for many applications.

Additionally, the present invention provides facilities that enhance or allow significant new functionality in data recording technology.

Other objects, features and advantages of the present invention will become apparent upon consideration of the following detailed description and the accompanying drawings, in which like reference designations represent like features throughout the FIGURES.

BRIEF DESCRIPTION OF THE DRAWINGS

FIG. 1 (Prior Art) is a schematic drawing of a length of servo-formatted magnetic tape.

FIG. 1B is TABLE 2 which is used in conjunction with FIG. 1A.

FIG. 1C-1 and 1C-2 is TABLE 1, Domain Definitions in accordance with the present invention FIG. 2 is a schematic drawing of a length of media, e.g., magnetic tape demonstrating the present invention in which:

FIG. 2A is a schematic drawing of a length of magnetic tape partially recorded in accordance with the method of the present invention.

FIG. 4A is TABLE 3, a set of rules for sequencing Group Allocation Units for a FULL WIDTH WRITE MODE Virtual Volume in accordance with the present invention as shown in FIG. 2.

FIG. 4B is TABLE 4, set of rules for sequencing Group Allocation Units for a HALF WIDTH WRITE MODE Virtual Volume in accordance with the present invention as shown in FIG. 2.

FIG. 4C is TABLE 5, set of rules for sequencing Group Allocation Units for a LESS THAN HALF WIDTH WRITE MODE Virtual Volume in accordance with the present invention as shown in FIG. 2.

FIGS. 5A–E are depictions of exemplary recording modes indicating the relative placement of data in Virtual Volumes filled from LBOT according to the present invention as shown in FIG. 1A in which:

FIG. 5A s a depiction of a length of tape showing the placement of a single Virtual Volume in the HALF WIDTH WRITE MODE;

FIG. 5B is a depiction of a length of tape showing the placement of a single Virtual Volume in the FULL WIDTH WRITE MODE;

FIG. 5C is a depiction of a length of tape showing the placement of a "i" number of Virtual Volumes in the HALF WIDTH WRITE MODE;

FIG. 5D s a depiction of a length of tape showing the placement of a "i" number of Virtual Volumes in the FULL WIDTH WRITE MODE; and FIG. 5E s a depiction of a length of tape showing the placement of a "i" number of Virtual Volumes in mixed WRITE MODES.

FIG. 10A is a TABLE 6 which is used in conjunction with FIG. 10.

Figure 1A:
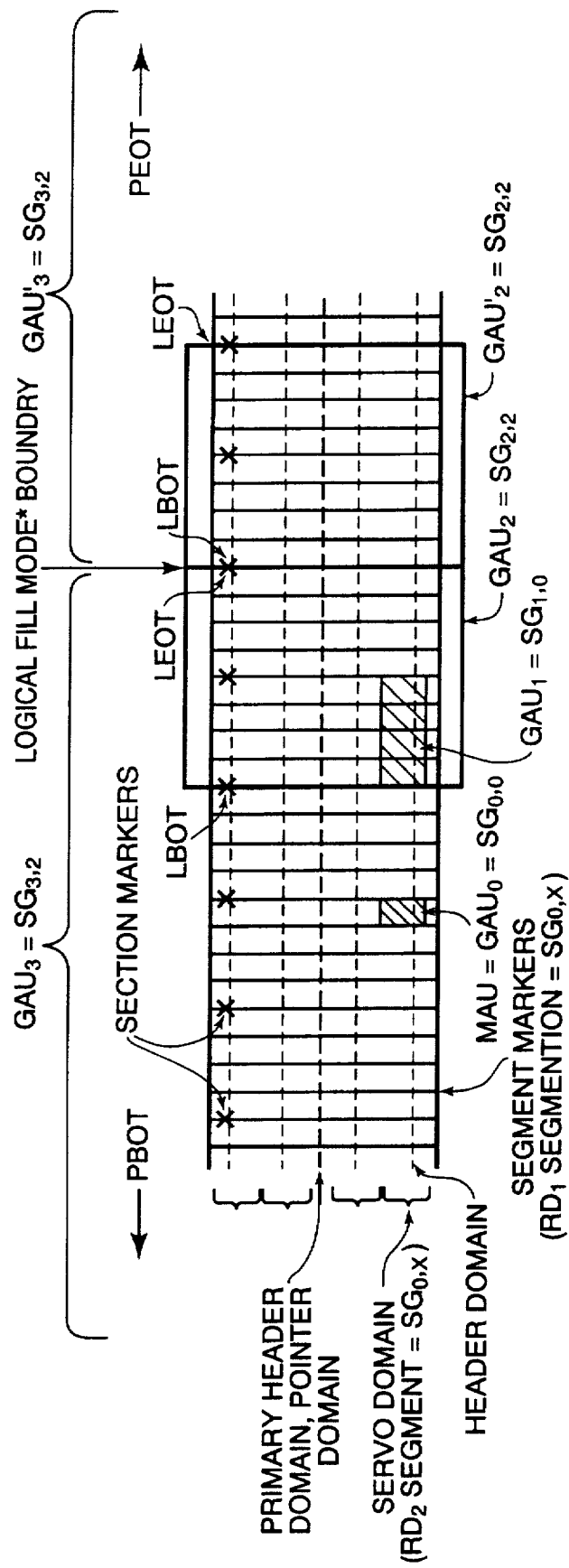
FIG. 1A, depicts examples for tape recording of the general form of Group Allocation Unit recording techniques in accordance with the present invention.

The drawings referred to in this description should be understood as not being drawn to scale except if specifically noted.

DETAILED DESCRIPTION OF THE INVENTION

Reference is made now in detail to a specific embodiment of the present invention, which illustrates the best mode presently contemplated by the inventor(s) for practicing the invention. Alternative embodiments are also briefly described as applicable. It will be recognized by persons skilled-in-the-art that the present invention is suited to a variety of implementations; for example, in an application specific integrated circuit, in firmware code embedded in a microprocessor or its adjunct integrated circuit memory chips, or even in a subsystem software. Moreover, it will be recognized that the constructs are also applicable to a solid state storage device as a tri-dimensional implementation. Therefore, no limitation on the manner of implementation is intended by the inventors in this disclosure.

The recording method disclosed is applicable to substantially all forms of media available. For the purpose of this disclosure, such media may be thought of as a Storage Volume. A Storage Volume generally consists of a substrate (such as an aluminum or glass disk platter, plastic tape backing, or the like), on which a recording medium is attached (such as iron oxide, chromium dioxide, cobalt-chrome, metal particle, barium ferrite, or the like), with the medium housed in a form compatible with technology (such as disk drives, tape drives, or the like).

Media is said to have a Physical Recording Domain. This is the region where the drive, subsystem, and host computer data can be recorded. For example, in magnetic tape, the Physical Recording Domain is generally the full width of the tape from the physical beginning of the recording medium on the substrate to the physical ending of the recording medium; on a disk, it is the full extent of the recording medium on the recording substrate of the volume.

Media is also said to have a Logical Recording Domain. This is the region where data is allowed to be recorded as constrained by the formatting within the Physical Recording Domain. For example, on tape it is the region within track boundaries from a beginning of tape marker ("BOT") to an end-of-tape marker ("EOT"); on a disk it is the region within the bounds of each designated sector on each concentric track from the innermost to the outermost defined track, plus those areas used by the subsystem for file directories or spares; a single, spiral track is equivalent to a tape image.

The Logical Recording Domain is organized into multiple independent Recording Dimensions "n" (where "n" is an integer greater than or equal to one), hereinafter denoted as "$RD_i$" (where "i" is an integer from one to "n"). Each Recording Dimension $RD_i$ is in turn divided at the finest recording granularity into a multiplicity of segments "$a_i$" (where "a" is an integer greater than or equal to one), hereinafter denoted, e.g., "$RD_1$" into "$a_1$" segments, "$RD_2$" into "$a_2$" segments . . . "$RD_n$", into "$a_n$" segments.

Recording Dimensions may be further defined. As examples that will be helpful to the understanding of the present invention:

$RD_1$ may be a longitudinal dimension; on a tape this might comprise "$a_1$" segment or timing markers regularly spaced along the media, e.g., at one foot intervals;

$RD_2$ may be a cross-width dimension, e.g., divided into "a2" partitions called servo domains (defined in more detail below), being that region over which data element (bits or bytes of digital data) positioning is controlled by a particular servo position reference feature; e.g., in serpentine tape recording an $RD_2$ could be a region of tape bounded longitudinally by a BOT and EOT pair of markers and transversely by the maximum physical distance between a formatted servo track and a data recording track over which track following tolerances can be maintained; or, in disk recording, it could be a concentric band (near-concentric for a spiral track disk) whose width is bounded by the maximum distance between a servo track and a data track over which track following tolerances can be maintained;

$RD_3$ may be a transverse dimension; e.g., physical tracks that make up a disk cylinder; and so on through $RD_n$.

Segments "$_ea_i$," in any Recording Dimension, RDi, can be grouped into Segment Groups, hereinafter "$SG_i$. As examples, in $SG_1$, twenty one-foot segments may be grouped to form a sector of a tape medium; four 512-byte disk sectors are grouped to make a 2K-byte page. Furthermore, groups of segments can also be grouped, $SG_g$ (where "g" is an integer greater than or equal to two), e.g., where several sectors on a tape, or several pages on a disk, define a Virtual Volume. Moreover, groups of Segment Groups can be grouped into supersets, $SG_{gk}$ (where "g" is greater than two and "k" is greater than or equal to one); that is, several Virtual Volumes of one predetermined category and several Virtual Volumes of another predetermined category, e.g., several Virtual Tapes of differing categories, several Virtual Tracks forming a Virtual Cylinder for a disk, or several Virtual Cylinders forming a Virtual Disk Volume.

A Minimum Allocation Unit ("MAU") for a Virtual Volume is bounded by the segmentation in each of the "n" Recording Dimensions, $RD_n$. That is, Segment Grouping, $SG_0$, where $SG_0$ is specifically the length of one segment in each Recording Dimension, $RD_i$, where i=1 through n results in:

$$MAU = SG_{i1} \ldots SG_{ik} \ldots SG_{in},$$

where each ik=0, and k=1 through n.

A Group Allocation Unit ("$GAU_i$") then defines particular collections of MAU using the following notation:

$GAU_0$ defines an MAU;

$GAU_i = SG_{g1}, SG_{g2} \ldots SG_{gn}$; that is, Segment Groups at the $g_1$ level in the $RD_1$, at the $g_2$ level in $RD_2$, through the $g_n$ level in $RD_n$; and, further, i=maximum of $g_1$, $g_2$ ... $g_n$ In general, a GAUhd iis greater than one MAU in accordance with the following:

$$GAU_i = SG_{g1} + SG_{gk} + \ldots SG_{gn},$$

where:

k=1 through n;

n=number of recording dimensions;

each $g_k$ is greater than or equal to zero and at least one $g_k$ is greater than zero;

the maximum of $g_k$=i;

and further, for each possible i, the following holds:

$$GAU_i = SG_{g1} + SG_{g2} + \ldots SG_{gn}, \text{ and}$$

$$GAU_{i+1} = SG_{g1} + SG_{g2} \ldots SG_{gn},$$

where each $g_k$ for $GAU_{i+1}$ is greater than or equal to $g_k$ for $GAU_i$;

at least one $g_k$ for $GAU_{i+1}$ is one greater than $g_k$ for $GAU_i$; and the maximum $g_k$ for $GAU_{i+1}$=i+1, and further, where $$GAU_i = SG_{g1} + SG_{g2} + \ldots SG_{gn} \text{ and}$$

$$GAU_i' = SG_{g1} + SG_{gk} + \ldots SG_{gn},$$

where $g_k$ for $GAU_i'$ are simply not all equal to $g_k$ for $GAU_i$, and the maximum $g_k$ for $GAU_i$=the maximum $g_k$ for $GAU_i'$=i; Wherein:

$$g_1 \ldots g_n \; 22 \; g_k$$

=0 for basic segmentation, no groupings;

=1 for groups of segments;

=2 for groups of groups of segments;

=>2 for groups of groups of groups of segments.

FIG. 1A, and FIG. 1B, depict an exemplary embodiment recording on a tape medium of the general form of Group Allocation Unit recording techniques in accordance with the present invention. Note that sets of MAU form a GAU, but that GAU can also be designated as a superset group of such sets, and such supersets can also be further grouped.

In disclosure of the preferred embodiment herein, a cassette-type magnetic tape is used to exemplify the broad aspects of the invention. This type of self-contained, dual reel cassette mechanism is advantageously used to allow tape to be loaded and unloaded at intermediate points along its length, substantially eliminating rewind and file access procedures under, for example, QIC Standards for the ANSI X3.55-1992 cartridge. Contrary to the current trend towards narrower, longer tape media (e.g., ¼-inch, 8 mm, 4 mm DAT, 2.5 mm), a relatively short, wide tape may be chosen to maximize the cross-width recording dimension while minimizing its length and, hence, the overall mechanical access time to any particular position on the tape. For example, as opposed to a ¼-inch tape cartridge having a tape length "x," a cassette with ½-inch wide tape in a length "x/2" provides more advantages in implementing the present invention and still is capable of fitting into the standard 3.5-inch form factor docking bay common to personal computers.

The New American Computer Dictionary, Signet Books division of Penguin Books USA Inc., New York (copr. 1983, 1985), under the definition of "field" states:

"Data within a computer are organized into the following hierarchy:

Several bits form a character,

Several characters form a field,

Several fields form a record,

Several records form a file,

Several files form a library."

In this disclosure, the term Volume shall mean a unit of recording media that is individually managed by the host computer on the installation independent of the data recorded therein. One or more files may be recorded on a Volume. Since in the data storage industry the term library has generally come to mean an apparatus for manipulating a plurality of media (such as the Storage Technology Corporation model 4410 Automated Cartridge System or a "jukebox" of tapes or compact disks), in this disclosure, the term "library" is modified to data-library to refer to a cataloguing or grouping of files and to Volume-library to refer to a cataloging or collection of Volumes of data. Furthermore, as used in this disclosure, a volume, such as tape or disk, is said to store a collection of related data blocks, where a data block is composed of some collection of the data items defined above, that is characters, fields, or records related in some fashion (e.g., collected in the same file or data-library and usually contiguous in recording medium location). The definitions of terms used to describe the portion of a volume used for recording are set forth in TABLE 1, FIG. 1C.

Referring to FIG. 2, an exemplary recording tape 1 has a full recording area, referred to as its Physical Recording Domain, as detailed above. Similarly, the exemplary tape 1 may be said to have a predetermined number of dimensions mapping its recordable surface area, thereby defining its Physical Recording Domain. Physical Beginning of Tape ("PBOT") and Physical End of Tape ("PEOT") markers 5, 7 (coded bits or bytes having a predetermined significance to the host computer or recording medium drive controller microprocessor) are recorded on the tape 1 near each physical end of the tape that is wrapped around or affixed to the supply and take-up tape reels. These PBOT/PEOT markers 5, 7 are used as delimiters to keep physical tape motion within specific boundaries to avoid the head from leaving the medium.

A Physical Recording Domain may be further subset by marking off areas that the subsystem may need for subsystem data or administrative functions and dividing the rest into identifiable, individually recordable units, separated from the other recordable units by some distinct marker(s) 11 (which use some of the physical recording area). This subset of the recording domain is herein referred to as the Logical Recording Domain.

In the manner as applied to the invention of this disclosure, logical units, that is, complete units of information describing something and each having its own identifiable location, or address, are defined on the medium. The physical beginning of addressable logical units is identified by a Logical Beginning of Tape ("LBOT") [or other medium] marker. The physical ending of addressable logical units is identified by a Logical End of Tape ("LEOT") [or other medium] marker. In contrast to the present invention, in standard tape recording methods in the art, because tape is generally longitudinal in nature, LBOT is not used because PBOT defines the beginning of the Physical Recording Domain and PEOT and LEOT are also generally identical. When LEOT is not identical to PEOT, LEOT is used to indicate that the recording head is in close proximity to PEOT but does not indicate the end of the addressable unit. (In disk recording, another example is a 3.5-inch floppy disk which is said to have a 1.44 megabyte capacity when formatted in DOS because it is partitioned into 2847 Fixed Block Architecture constructs called "sectors," each sector having a storage capacity of 512 bytes. With respect to the present invention, the terms sector is used in a different manner as described hereinafter.)

Before recording data blocks, it is known that a medium comprising a Volume is formatted, that is the Logical Recording Domain is delineated by prerecording timing and location markers in appropriate places in each of its several dimensions by means of which blocks of data can be found after reference to a directory, that is, a description, listing, and allocation mapping of all the sets of data blocks making up the set(s) of files that are recorded on the Volume.

One particular type of record, either administrative or otherwise, important to the present invention is referred to in the art as a header. A header is a record written in a specified media location, delineated as a header domain, used to identify the characteristics of data recorded on a medium and to hold or identify location of system and other control management information. Part of the control information in a header record is known as a pointer. A pointer is a data element, such as a field or a record, which provides information to a specific control instruction and which contains an address that is pertinent to the processing of records.

As shown in FIG. 1 (Prior Art), a section of a magnetic tape 1 is formatted in preparation for data recording in accordance with the method of the present invention by one of the techniques known in the art. Such media can be formatted by the user or pre-formatted by the media manufacturer for immediate recording use. To optimize the present method, it has been found that a servo-format for servo-positioning a movable transducer head to the a servo-track, or lines, is preferred (see e.g., U.S. Pat. No. 5,008,765 (Youngquist) or U.S. Pat. No. 5,055,951 (Behr), incorporated herein by reference). Servo-lines 2 as shown are exemplary. Such servo-lines 2 make up two servo track partitions that allow specific servo positions to be established. These positions are referred to as servo positioning features and serve to locate reference positions, hereinafter referred to as "servo tracks 9" as shown in FIG. 2. In alternative embodiments, discrete servo tracks could be used to provide an equivalent function, to enable the drive and host computer to position a particular read-write head element precisely on a particular data track.

Figure 2C:
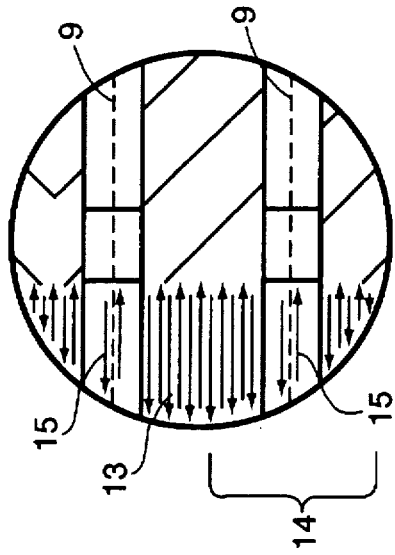
FIG. 2C is a schematic drawing of a magnified portion of the magnetic tape as shown in FIG. 2A demonstrating serpentine data tracks.

Referring back to FIG. 2C, whichever servo-track format is used is a determining factor in the method of the present invention to partition the cross-width dimension of the Physical Recording Domain into servo domains 14. In FIG. 2C, the tape has been formatted to include four servo domains 14. A servo domain 14 comprises the total number of data tracks 13 associated with a particular servo track 9 on the media. Further, a $GAU_0$ will be the extent of the Logical Recording Domain bounded in the cross-width dimension as described herein for servo domains 14 and in the linear dimension by section markers 11. Because of the recording capability for a high density of bits per inch longitudinally and the high number of tracks 13 across the cross-width dimension of the servo domain 14, and the limitations imposed by dimensional stability tolerances of the media 1, mechanical tolerances in the state of the art require that in a read-write head (not shown) only a limited span separate servo tracks 9 from its appendant data tracks 13 for accurate data storage and retrieval. That is, the physical span between the servo track 9 following head element and the most distal read-write head element in a head must be such as to precisely position the head at all times to prevent read/write errors from occurring. The number and placement of servo tracks 9 employed is thus dependent upon the state of the art of media and head manufacturing and servo positioning systems.

To optimize the system performance in accordance with the present invention, it is desirable that data be recorded simultaneously in parallel tracks 13 within any servo domain 14. For example, to record simultaneously a concurrent, parallel, byte-wide set of tracks to enhance the data transfer rate over serial recording apparatus, a device would require a head with eight write head elements, a head element for servo-track following, and head element for writing header data on a current header track (as discussed hereinafter). For installations less sensitive to performance and extremely sensitive to cost, a three-element array such as demonstrated by Youngquist might be more practical in the current state of the art.

Figure 2B:
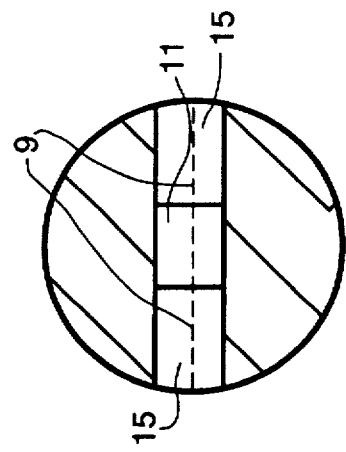
FIG. 2B is a schematic drawing of a magnified portion of the magnetic tape as shown in FIG. 2A demonstrating a segment marker interposed between two headers.

In the present invention, a second aspect of the formatting step is the recording of at least one identification header track 15 along the full length of the media, such as exemplified by a length of tape in FIG. 2 between the PBOT and PEOT markers 5, 7. Referring to FIGS. 2A and 2B, during (but possibly before or after) the servo-formatting of the tape, at least one header track 15 is recorded. This primary header 15 includes retrievable information such as media manufacturer identification, manufacturer lot number, date of manufacture, and other useful media management systems information, and further, as detailed hereinafter, identifies the entire media or any segment along or downstream of the primary header 15 as unused. Referring briefly to FIG. 5, in the preferred embodiment, a single, primary header/pointer track is located (for example, along the longitudinal center line 20—20 (FIG. 4) of the tape 1) so as to not be used for any user header data. This primary header/pointer track also contains interspersed along its recording length a set of fields that will initially be written (e.g., by the manufacturer) with flagged pointer data (indicating the tape is unused) and will later be overwritten with updated pointer data (as described hereinafter).

At equal intervals along the entire length of the longitudinal dimension of the media, demarcation indices, segment markers 11, are recorded at regular intervals in order to partition the entire physical tape into segments 3 (a component that can be assumed to be self-contained, possessing a set of defined attributes, specifically the length of medium in the longitudinal dimension between two consecutive segment markers 11)—labelled in FIG. 2A as segments "a, a+1, a+2" et seq. through "s"; that is, using the general notation set forth herein, $RD_i$ is divided into "$a_i$" segments, where "$a_i$"="s." The segment markers 11 are read-write head position initialization indices for longitudinal positioning of the head along the length of the physical tape recording domain. In effect, the segment markers 11 provide timing markers for data to be recorded between the PBOT and PEOT markers 5, 7. The segment markers 11 can be as simple as predetermined timing marks running vertically across the full cross-width of the tape, can be incorporated into the servo tracks 9, or into the primary headers 15 as shown in FIG. 2B, where redundant primary headers 15 are recorded in the track before and following the segment markers 11. Segment markers 11 define the smallest subset of the longitudinal dimension of the media.

Performance demands will generally require the use of longitudinal sections that are longer then one segment. A section is thus the most practical grouping of contiguous segments for a particular implemention. For illustration, this is noted in FIG. 2A as segment groups, labelled as "b, b+1, et seq. through m." Sections are delineated by flagging predetermined segment markers 11, thereby marking them as section markers.

To optimize the method of the current invention, it has been found that in a drive that streams the tape at eighty inches per second ("ips"), placing segment markers 11 every foot and grouping twenty segments into a section balances the desire for a short physical distance travel time with the desire to reduce serpentine recording mode turnaround (reversal of recording direction) requirements. Recording between two such section markers at eighty ips for two seconds with a turnaround time of 380 milliseconds provides an eighty percent (80%) recording duty cycle. As with the servo tracks 9, a blank tape can be written (for example, during the tape manufacturing process) in one pass with a head containing a large array of write elements to provide the number of primary headers 15 and segment markers 11 desired for the intended read-write recording head to be employed in the tape drive. Section lengths can be designated by the user.

While four header and servo track group partitions across the width of the tape are shown in FIG. 2A, it will be recognized by a person skilled in the art that the number of medium servo domains 14 is also a design expedient that may fluctuate in accordance with the architecture of the drive mechanism employing the present invention and the state-of-the-art in recording media, e.g., recording density parameters and read-write head characteristics.

The tape 1, formatted with servo-tracks 9 and primary header tracks 15, is now prepared for data block recording.

In the exemplary embodiment, the tape 1 has "a" through "n" segments separated by the timing markers 11 in its longitudinal recording dimension with each segment having multiple servo domains 14 from tape edge to tape edge across the cross-width dimension of the tape 1. Each servo domain 14 will accommodate "t" number of data recording tracks 13, as shown in FIG. 2C. It is contemplated that the tape cross-width will support a number of tracks, "t," where "t" is an integer designating a range of tens to thousands.

For optimization of use, there will be a number of default settings for a system employing the method of the present invention that can be reset or optionally selected by the user.

Figure 3:
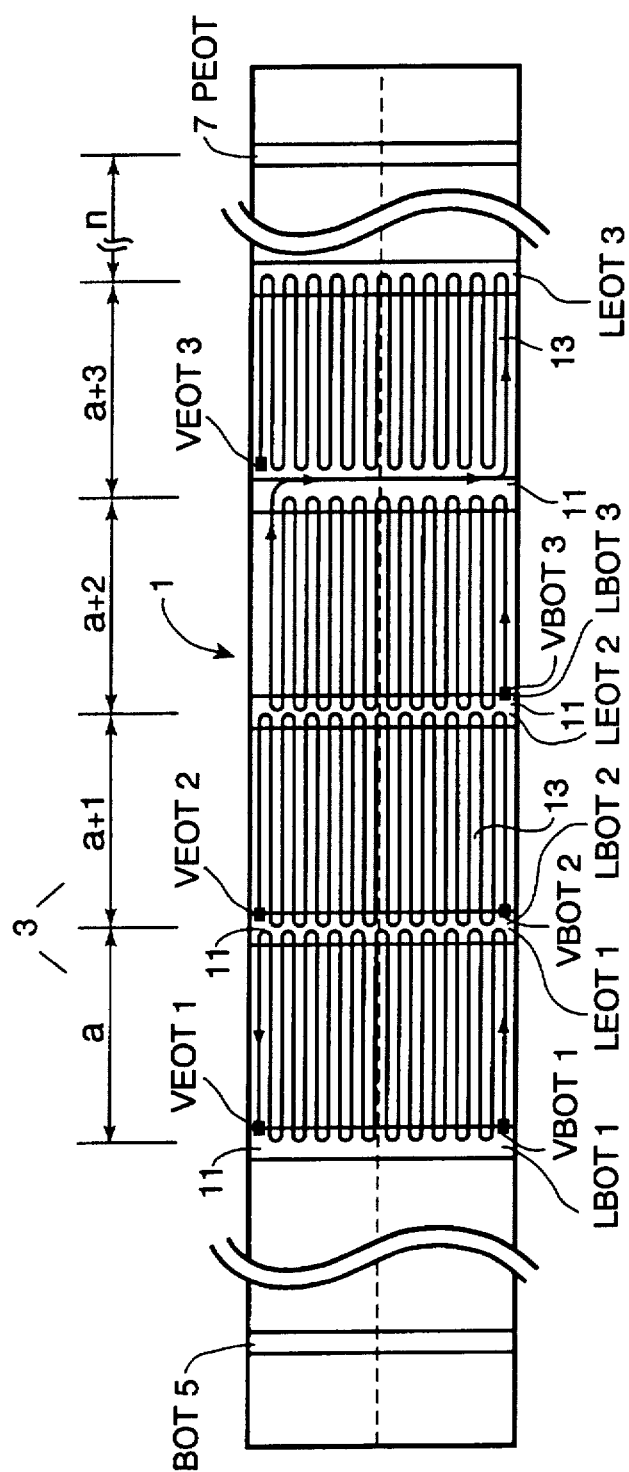
FIG. 3 is a schematic drawing of a length of magnetic tape demonstrating a simplified FULL WIDTH WRITE MODE recording in accordance with the method of the present invention as shown in FIG. 2.

Referring to FIG. 3, a WRITE MODE and MEDIA STRUCTURE of the present invention is user selected to FULL WIDTH WRITE MODE and structured into multiple Virtual Volumes. In the FULL WIDTH WRITE MODE, a recording head traverses the tape 1 longitudinally between designated section markers 11 in a serpentine manner within one or more than one contiguous MAUs (not shown) from the bottom edge of the tape to the top edge (although cross-width recording direction is not critical).

In a FULL WIDTH WRITE MODE, using a new tape, the first data block may start at the section marker 11 first downstream from the position the manufacturer leaves the tape for packaging and shipping (which may be, for example, mid-tape or nearest the PBOT marker 5). An important aspect of the present invention is that recording can be initiated anywhere within the recording domain as will become further apparent from this disclosure.

Figure 6:
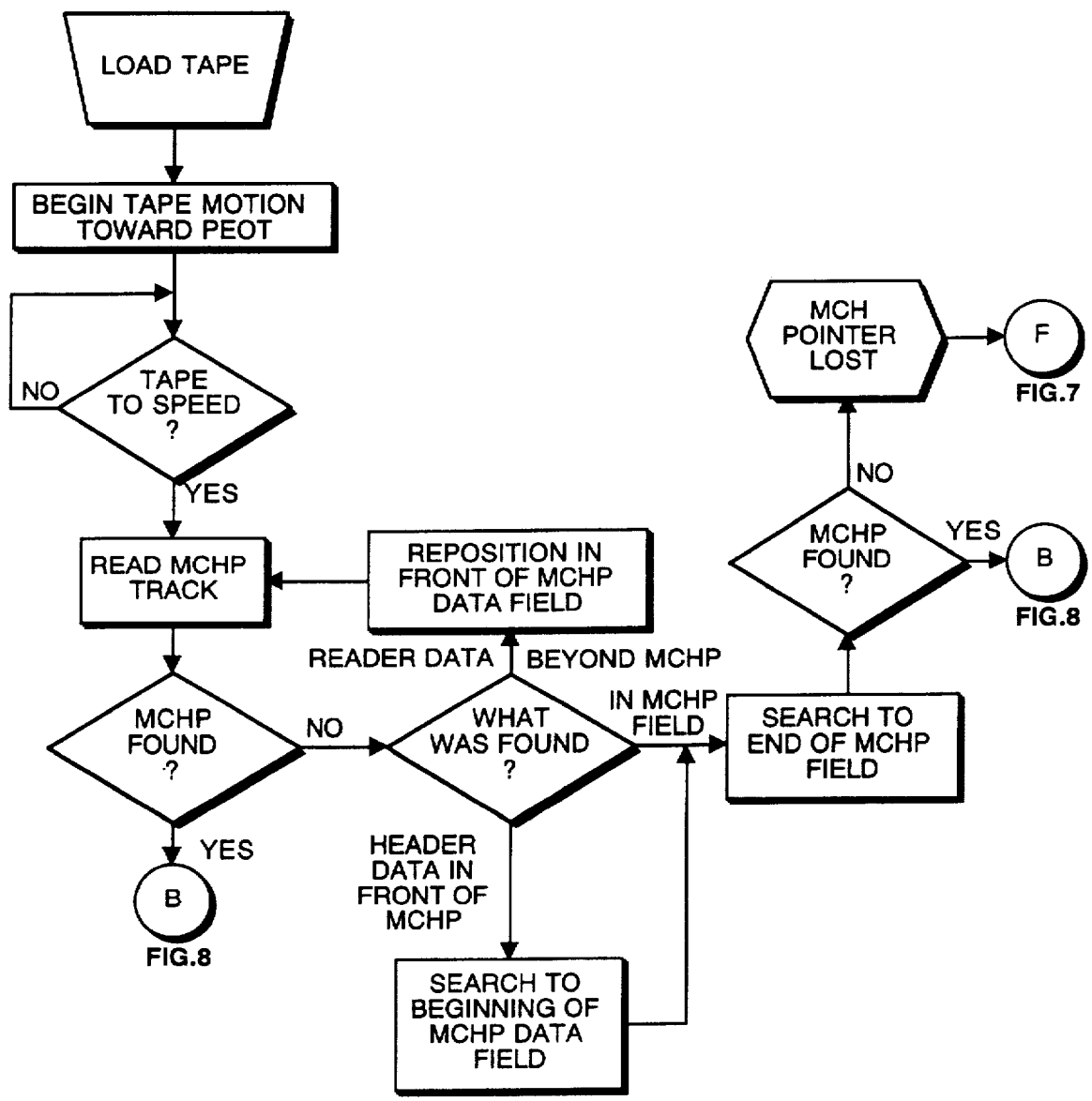
FIG. 6 is a flow chart of the beginning of the local media initialization routine of the method of the present invention as shown in FIG. 1A.

The drive is initialized (refer also to FIGS. 6 and 8) upon loading the tape into the drive transport mechanism to read the primary header/pointer track. The track is read and a pointer to a Most Current Header track is obtained. Having done so, the head is then positioned so as to place the appropriate head element in position to read the designated header track. On a new tape, the head element reading the primary header/pointer track will find the primary header 15 information and a pointer. Since a new tape is in use, the pointer directs the recording head to the first available space on the tape for recording downstream of the PBOT marker 5 (or the next available GAU) when moving the tape in the direction of the PEOT marker; the header includes predetermined data bits in a predetermined field flagged to indicate that the next GAU has not yet been used for recording.

The first information recorded in the header associated with the GAU at the repositioned FULL WIDTH WRITE MODE start will be a marker designating that position as a start of a new collection of data blocks, hereinafter the Virtual Beginning of Tape ("VBOTx") [or other volume] marker, where "x" is an integer representative of the sequential Virtual Volume number. A VBOTx marker may or may not be coincident with an LBOTx marker (commonly a set of markers (specific or algorithmic), one for each $RD_i$) that bounds the area in which VBOTx is allowed to float. That is, LBOT/LEOT marker pairs delimit a specific section of a medium; in the preferred embodiment, the section bounded by flagged segment markers 11 defining the section. A VBOT marker thus designates the beginning of a valid collection of data blocks and a VEOT marker designates the ending of the recording area for a writing valid blocks of data. Between a currently written EOD marker and a VEOT marker, data from a prior recorded data block may still exist (and be recoverable or partially recoverable, as explained hereinafter with respect to Valid and Invalid Data).

Following the VBOTx marker, the data is recorded in serpentine fashion as indicated by representative arrow tracks 13 in FIG. 3 leading from VBOT1 to VEOT1, VBOT2 to VEOT2, et seq., where VBOT1 is coincident with LBOT1, and VBOT2 is coincident with LBOT2. For the purposes of this exemplary embodiment, the Virtual End of Tape marker ("VEOTx") is written following each collection of data blocks and coincident with the EOD marker since each Virtual Tape is full. The VEOTx marker is thus separated from its paired VBOTx marker only by the width of the tape or the length of one sector, but physically less than the longitudinal length of the data block recorded. Note that in standard longitudinal recording on a single or multiple linear tracks the start and end of such a collection of data record blocks would be separated by a much greater distance, up to the full length of a recording domain track.

In this simple example, two collections of data blocks bounded by VBOT1/VEOT1 and VBOT2/VEOT2 markers have been recorded to create two Virtual Tapes equivalent to filling the $GAU_i$ in sections "a" and "a+1", where the storage capacity of each Virtual Tape is equivalent to a full width tape section. Clearly, collections of data blocks can be of a capacity less than or greater than the full capacity of any such $GAU_i$. A shorter collection can be padded with a random pattern in order to fill the full $GAU_i$, but need not be if the contents of $GAU_i$ are managed (for example, with detailed directory information in a user header) at a finer recording granularity. If the collection of data blocks is longer than the capacity of one section of full width of the tape, sections are chained such as shown starting from LBOT3 to LEOT3, where from the top of the filled allocation unit in section "a+2" recording proceeds toward PEOT at the $GAU_i$ coincident with the section marker beginning section "a+3" and so on until the Virtual Volume is completely filled and a VEOT3 marker is recorded.

When the tape is filled, that is, all sections from PBOT to PEOT have been used, a set of Virtual Tapes, each having relatively short physical lengths has been created.

For Virtual Volumes as shown in FIG. 3 where the recording was commenced such that $VBOT_i$ is coincident with $LBOT_i$, then $VEOT_i$ will be adjacent to $LEOT_i$ and a partial rewind is necessary to continue recording on the tape. The user (or system) can then choose an endless recording loop mode, allowing the writing to continue by moving the locations of $VBOT_i$ and $VEOT_i$ an overwriting the oldest data blocks recorded on the Volume (see Scratch Mode recording detailed hereinafter). For Virtual Volumes where writing commenced other than at $LBOT_i$, the $VEOT_i$ is in the $GAU_i$ immediately on the $LBOT_i$ side of the $VBOT_i$ and the partial rewind has already been accomplished. In this case, the latest data block recorded is physically immediately adjacent the oldest block recorded, yet in terms of data recording chronology is the full length of the Virtual Tape from the oldest data block recorded. In the case where the decision is to overwrite the oldest data blocks, the $VBOT_i$/$VEOT_i$ pair is moved a specified number of $GAU_i$ from the current position toward the $VEOT_i$ position and the intervening $GAU_i$ are marked as Not Valid Data. Now writing is allowed to proceed until the tape is once again full and then the process is repeated.

By this serpentine recording of data on a tape on serpentine tracks within each $GAU_i$, an endless loop mode of recording Virtual Tapes has been established without the need for an endless loop recording tape cassette or cartridge. Partitioning of the tape into an even number of cross-width $GAU_i$ recording sub-domains (for example, a HALF WIDTH WRITE MODE described hereinafter) achieves this result without any intervening rewind motion. An odd number of cross-width recording domains-eventually would require a rewind to return to the $LBOT_i$ position of the tape in order to continue a chronological write.

The endless loop form of recording also eliminates the need to rewind a tape whenever unloading and the need to search to the end of the last recorded file to append or record a new data block on tape as is required in the QIC Standards.

Figure 4:
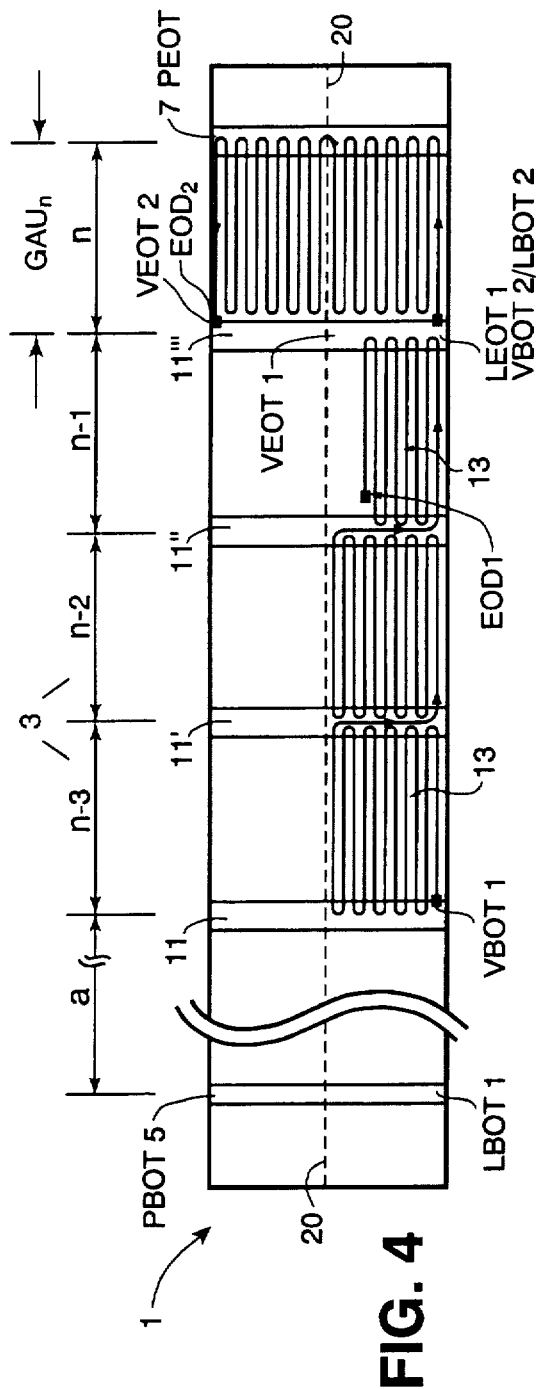
FIG. 4 is a schematic drawing of a length of magnetic tape demonstrating a simplified HALF WIDTH WRITE MODE recording in accordance with the method of the present invention as shown in FIG. 2.
Figure 5:
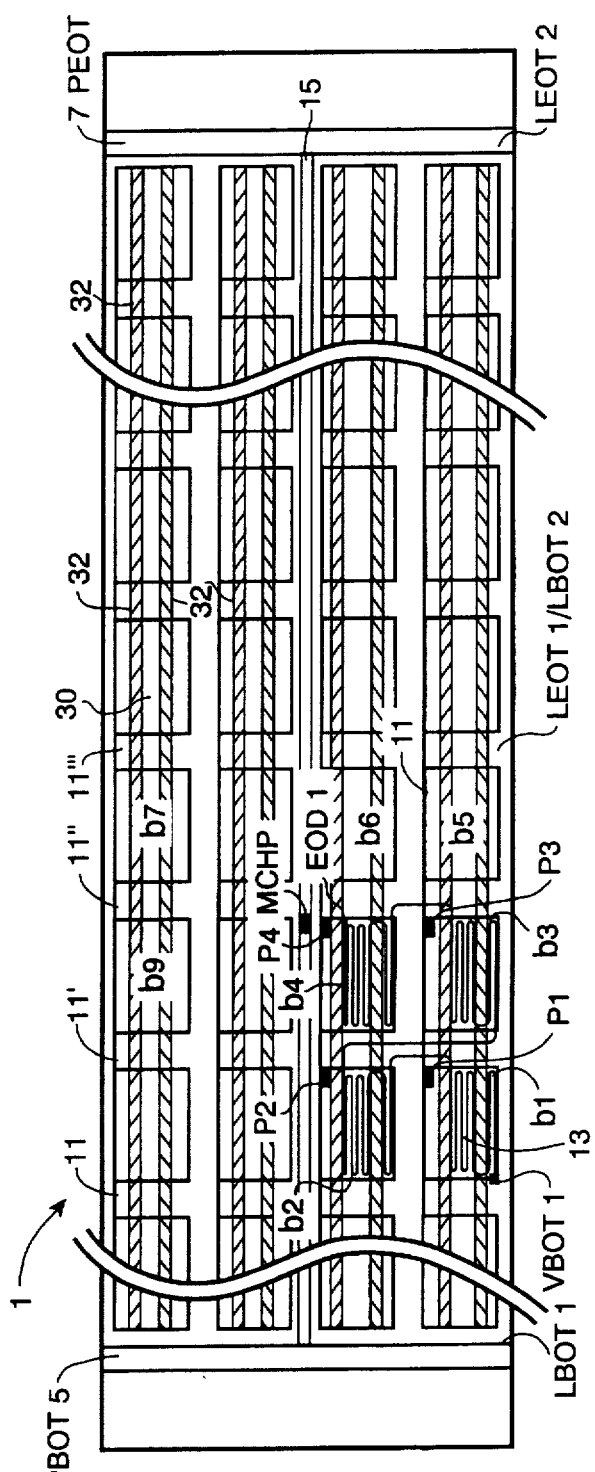
FIG. 5 is a schematic drawing of a length of magnetic tape demonstrating a sequence of recording in accordance with the method of the present invention as shown in FIG. 1A.

Before disclosing the rules for keeping track of data blocks in this packetized serpentine recording method, the advantages of an even number of cross-width partitions, such as a HALF WIDTH WRITE MODE, as a preferred embodiment is depicted in FIG. 4 where the flexibility of the recording method of the present invention becomes more apparent. For this reason, the preferred default WRITE MODE is the HALF WIDTH WRITE MODE and the preferred default MEDIA STRUCTURE is one Virtual Volume.

The first data block to be recorded follows the setting of a VBOT1 marker In a GAU of the tape on the PEOT side of a section marker designating the start of a most current section, in this example section "n–3" at section marker 11, which is four sections upstream of the PEOT marker 7. By selecting a HALF WIDTH WRITE MODE, the tape drive has been commanded to fill tracks in $GAU_1$, between section markers 11 and 11''', only from the bottom edge of the tape to the physical center of the cross-width dimension of the tape, shown by the imaginary broken line 20—20. That is, when the $GAU_1$ recording tracks 13 nearest the center line 20—20 have been used, the head is repositioned to the bottom edge of the tape just downstream of the next section marker 11' to beginning filling downstream section "n–2." After using the allocation unit tracks nearest the center line 20—20 in section "n–2," the head is again repositioned to the bottom edge of the tape downstream in next contiguous section "n–1" at section marker 11'' and continues transferring the collection of data blocks to the first $GAU_1$ of section "n–1." At the end of the collection of data blocks, although the remainder of the next series of contiguous tracks could be recorded with a filler stream of data up to the next section marker 11''', rather than waste recording time and space, an index marker designated as the End of Data ("EOD") is recorded. In this manner, data can be appended directly to the first Virtual Tape on the unrecorded tracks of the allocation unit following the EOD marker.

When the next collection of data blocks specifically intended for the next Virtual Volume is ready to be transferred to the tape, the head is repositioned to the next downstream section marker 11''', that is, the start of section "n," and LEOT1 and LBOT2 and VBOT2 markers are recorded at section marker 11'''. Alternatively, the VEOT1 and LEOT1 markers can be recorded immediately at the finish of the transfer of the data block following the EOD marker and VBOT2 and LBOT2 can be recorded immediately following VEOT1, starting the next data block record in the allocation unit where the immediately previous block ended. However, this creates a more complex space management construct and affects the performance of the endless loop characteristic of tapes with an even number of partitions in the cross-width dimension, e.g., the HALF WIDTH WRITE MODE of recording.

In the example, the next collection of data blocks is also of a length greater than the capacity of the half width set of $GAU_i$ where the PEOT marker serves as the downstream termination index. Since the HALF WIDTH WRITE MODE has been selected, the next contiguous section and $GAU_i$ within the section is in an area of tape immediately across the tape physical center line 20—20. Data block recording thus quickly continues by repositioning the head to just above the center line 20—20 where the serpentine recording continues until the end of the data block where an EOD2 marker and a VEOT2 marker is recorded (note that Virtual Volume 2 is now full). Alternatively, the head could be positioned to the upper edge of the tape with recording proceeding on serpentine tracks toward the center line 20—20. When additional data is to be appended to Virtual Volume 1, the next data block will start at the EOD1 marker and fill that $GAU_1$ set. Then the LEOT1 reflection point will cause wrapping to fill the $GAU_1$ in the area immediately above, moving toward PBOT 5 between section markers 11" and 11'''.

Thus, in the HALF WIDTH WRITE MODE (or, alternatively, a THIRD WIDTH WRITE MODE, QUARTER WIDTH WRITE MODE, EIGHTH WIDTH WRITE MODE, etc., or even into unequal reflection modes, for example a QUARTER WIDTH WRITE MODE paired with a THREE-QUARTER WIDTH WRITE MODE,) the serpentine recorded data blocks within allocation units are themselves recorded in a serpentine manner on the tape. While the cross-width of the tape can also be partitioned into more than two recording domains, for example into a QUARTER-WIDTH WRITE MODE format, there do not appear to be any immediate advantages to do so as a best mode of practicing the present application.

In the HALF WIDTH WRITE MODE (or any mode with an even number of divisions), an endless recording loop has been created without the performance impact of a partial rewind. Recording may start by writing VBOTx almost anywhere on the tape 1 (although for ease of head positioning, on the first track on the edge of tape immediately following a section marker 11 is preferred). When the PBOT 5 or PEOT 7 (or, alternatively, LBOT or LEOT) mark is reached, recording on the other half (or other partition) of the tape 1 in the opposite longitudinal direction commences. Thus, when the tape 1 is filled, the head is positioned at VBOTx again. As described for the FULL WIDTH WRITE MODE, a decision can then be made whether to request a new tape or simply write over the data record following VBOTx by first repositioning the VBOTx/VEOTx pair.

The WRITE MODE options, FULL WIDTH, HALF WIDTH, QUARTER WIDTH, etc., may be user defined in an initialization routine immediately after a tape is loaded into a drive or the drive is re-initialized after a shutdown period. Optimally, a default to the HALF WIDTH WRITE MODE is provided.

FIG. 4A is TABLE 3, a set of rules for sequencing Group Allocation Units for a FULL WIDTH WRITE MODE Virtual Volume.

FIG. 4B is TABLE 4, set of rules for sequencing Group Allocation Units for a HALF WIDTH WRITE MODE Virtual Volume.

FIG. 4C is TABLE 5, set of rules for sequencing Group Allocation Units for a LESS THAN HALF WIDTH WRITE MODE Virtual Volume. Note of TABLE 5 that this exemplary set of rules fills GAU from the "edges" of the tape toward the center. Other fill patterns can be used when preferred (e.g., from one edge to the other (i.e., bottom to top or bottom to center than top to center) and the rules would be recognized by those skilled in the art as permutations of this exemplary set.

Another optional feature of the initialization process is to allow the user to designate multiple layers of $GAU_i$ Virtual Tape marker pairs (for example, WRITE MODE markers, LBOT/LEOT pairs, or the like), or accept any set default, prior to recording data blocks. In other words, the user is permitted to predesignate a multiple number of recording sections 3 as the number of sections defining one Virtual Tape. For example, if the user generally records very long data blocks and later appends files to the blocks, it may be convenient to predesignate every group of contiguous ten sections 3 as a Virtual Tape. In this manner, a tape having a 4001-foot recording domain length, formatted every two feet (two hundred section markers 11), using a HALF WIDTH WRITE MODE, would be designated as having forty separately identifiable Virtual Tapes, twenty in each direction, each being physically very localized in terms of files within a collection of data blocks serpentine recorded within the allocation units of those sections 3. Another user, interested in a quick transfer from the host may designate one section, that is one Virtual Tape, as being 100 section markers 11 in length.

With the above-described flexibility in WRITE MODE operations, it is important that the system be capable of keeping track of not only the information supplied in the primary header 15, but similar tape management system information for employing the method of the present invention.

Referring to FIG. 5, once a new, or "virgin," tape that has been formatted with the primary header 15 is first used for recording with the method of the present invention, each GAU b1 et seq. formerly governed by a primary header 15 must have the primary header 15 data at least partially copied within a new user header accompanying a data record. That is, as the first track of the GAU b1 containing only a primary header 15 begins to be filled with a data block from the host computer, part of the primary header 15 designated for real time recording use is copied within a Most Current Header ("MCH") containing information necessary to manage the tape now in use. The MCH can in turn be in the same area as the primary header and may overwrite part of it, but, as shown in FIG. 2, this is not the preferred approach, except that it is preferred that the MCH pointer ("MCHP") partially overwrite the primary header pointer (i.e., in previously specified pointer fields) so that it is protected from an overwrite. Therefore, in addition to primary header coding between adjacent section markers 11, the user header structure contains fields having codes for at least:

a unique identifier for each header (e.g., 4 bytes counter) for the effective life of the tape (e.g., n×100 k passes, where n is greater than or equal to 1, that maintains header chronology;

identification of the user, the system and subsystem;

application specifications;

physical motion data to be used for header chronology searches, including a flag bit or byte designating the last header recorded as the Most Current Header;

residual data validity/integrity notation for all data recorded on the tape;

VBOT/VEOT addresses ("directory") of each collection of data blocks for resolving location and direction of physical motion requirements;

Label Data for each Virtual Volume in the virtual library that comprises the entire recording domain; and pointers.

As the user header will comprise one set of tracks per allocation unit, the header has a great capacity variable, dependent upon the length of tape selected for spacing the section markers 11, e.g., two feet at 100 kbytes/foot. This further permits extensive user definable fields to be incorporated in a current header.

The pointers have at least three important functions. During recording, a pointer is placed in any header of a $GAU_i$, for example b1, that is about to overflow into the next contiguous GAU b2, to chain that next GAU b2 to the current GAU b1 in which the pointer is provided. A second use of the pointers is when the tape drive is instructed to physically position the head over a different physical portion of the medium. For example, when the head is positioned in the last record or file on the Virtual Volume which was some number greater than one, such as "FILE NO. 5," and the user wishes to position at the beginning of an earlier written file, such as "FILE NO. 2," and either READ or over-WRITE the file; for such motions, the pointer indicates that even though the data of the current file might continue into the next GAU, the tape was physically moved from this GAU to the GAU that represents the desired physical position, i.e., the target GAU (in this example, the first GAU of FILE NO. 2). After motion is completed, the pointer in the target GAU is updated to indicate where the head was previous to coming to this GAU (again, in the example, somewhere such as the last GAU of FILE NO. 5). These pointer notations provide a physical motion map of the data read/write history for the tape. They may be implemented as a single pointer, but in the preferred embodiment it is as a set of pointers.

The other function occurs upon the termination of activity for a tape, for example, when a REWIND AND UNLOAD or an UNLOAD command is received. A Most Current Header pointer ("MCHP"), written in the pointer fields of the primary header/pointer track, is used for immediate identification of the Most Current Header which is specifically one of the headers in the section of tape accessed just before termination, that is, the most recently updated header on the tape. In other words, the MCH pointer identifies which $GAU_i$ contains the last data block accessed. That $GAU_i$ in turn has its header pointer point to itself to identify its own $GAU_i$ as the $GAU_i$ containing the last data block accessed. The most current instance of all the above-mentioned header fields are recorded here in this Most Current Header. The pointer in the Most Current Header that points at itself is designated the Current Header Pointer ("CHP"). When a tape is reloaded and recording resumes, the MCHP and CHP pointers are updated to indicate this is an "open" $GAU_i$; meaning that, at some previous termination, this was marked as the MCH, but that it has been reaccessed and data may have been recorded beyond the bounds of this $GAU_i$ and must be verified. If the subsystem were to crash at this point, error recovery would reestablish this point as the MCH. If additional data is read/recorded such as to overflow into the next $GAU_j$, the header pointer would be updated to chain the two $GAU_i$ together. The next header recorded will in turn designate its pointer as the MCH pointer if the data block is the last to be recorded and processing of this tape is again terminated; otherwise, it will chain point forward (to the next $GAU_i$ per the WRITE MODE rules of TABLES 3, 4, and 5) to the next header.

To further understand the process of the present invention, assume that a partially recorded tape, as depicted in FIG. 5, is loaded into a tape drive transport and accessed by the host computer. Each unused allocation unit is shown having a blank area 30 of unrecorded tracks, a servo-track set 32, and the primary header 15. As the HALF WIDTH WRITE MODE is being employed, making the recording domain of the medium a high performance, endless loop tape, recording has begun by loading the tape as received from the tape manufacturer which has not rewound the tape to PBOT 5.

During that first initialization, after finding only primary headers over a short forward and backward position, the system determines that it is a new tape, and positions the head to begin recording at the first track of the next marker contiguous $GAU_1$ b1. Therefore, the first data block transferred from the host begins with a VBOT1 marker at the first track in $GAU_1$ b1 downstream of marker 11 and is recorded in a serpentine mode within allocation unit b1.

Beginning on the first track of allocation unit b1, a collection of data blocks is recorded in the HALF WIDTH WRITE MODE and has been completed, filling allocation units b1, b2, b3, b4, comprising a sector of tape between section markers 11, 11' and 11". If the primary header is coincident with subsequent user headers, it will be substantially simultaneously overwritten with a user header. However, in the preferred embodiment it has a unique domain and is not overwritten with user header data, but will be partially overwritten by the MCH pointer.

When allocation unit b1 becomes filled, its header is written with a pointer P1 to chain the collection of data blocks written to its continuation in allocation unit b2. Similarly, as allocation unit b2 is filled, its header is written with a pointer P2 to chain the continuing data being written to its continuation in allocation unit b3. Likewise, when allocation unit b3 is filled, its header is written with a pointer P3 to chain to allocation unit b4. The data block being written terminates within b4 and a EOD1 marker is written. If the allocation unit b4 is not filled, it may be left partially unwritten for later appended files for that block, or it is written with filler to complete the allocation unit and the EOD1 marker is written following the filler. As the head is now at EOD1, the header pointer P4 is written to point to it, thus P4 is a CHP rather than a chain pointer, and the primary header pointer is written (designated MCHP in the FIG. 5) to point at the header in b4 as the MCH and the recording is terminated. Upon reloading the tape, any additional data blocks are similarly written as described above starting at EOD1 or at the beginning of GAU b5, b6, where the LEOT1/LBOT2 designation indicates a reflection point to begin recording on the top half of the tape in b7, b8 et seq. The P4 pointer and MCH pointer are updated accordingly.

The next Virtual Volume can be recorded following LBOT2 at segment marker 11'" in sector c1 et seq.

At termination (the tape may even be unloaded), the head is generally "parked" at a position to find the MCH pointer upon starting the next initialization routine. Referring to the flow charts of FIGS. 6 and 7, when a tape is reloaded, or the drive re-initialized, tape motion begins toward PEOT and reads the designated track looking for the MCH pointer.

If found, the drive is directed to the Most Current Header track for updating, e.g., P4, the Current Header Pointer, "CHP", so that it can proceed to the appropriate (that is, in the example of FIG. 5, starting at EOD1) next contiguous allocation unit area for recording a new data block with a subsequent new Most Current Header. As the new data block is written, new pointers will be generated. Thus the CHP is downgraded to a chaining pointer because the header now being written will be the new Most Current Header and be assigned an MCH pointer if termination follows completion of writing the new data blocks.

Figure 7:
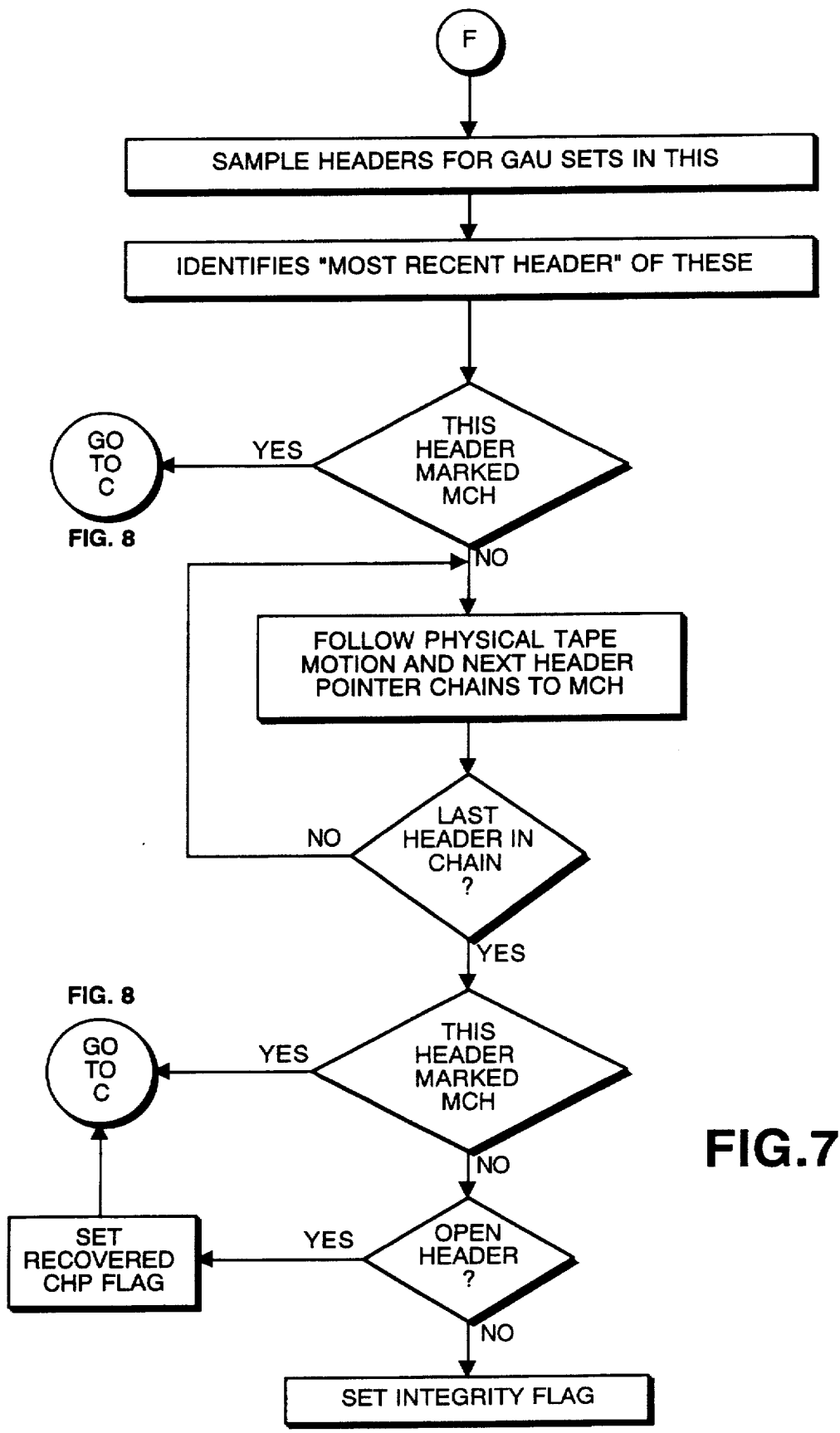
FIG. 7 is a flow chart of the position error recovery routine of the method of the present invention as shown in FIG. 1A.

If upon moving toward the PEOT marker, the MCH pointer is not found, position error recovery is instituted as depicted in FIG. 7. One recovery attempt may be used by searching forward one or more allocation units in search of recorded data or pointer fields and, if none is found, search backward one or more allocation units. Once a data or pointer field has been found, the allocation unit headers of that block of data can be checked to determine if it is the Most Current Header and thus contains the CHP. Note that if chain pointers are found, the chain is followed until the CHP is recognized. If an MCH pointer or CHP or open $GAU_i$ is not found, a position error flag is set, then either user (host or subsystem) intervention or implementation of a default override will be required.

By always positioning pointers in a known, identical physical location, for example as the last field in each primary header and each allocation unit header, seek operations can be optimized.

Figure 8:
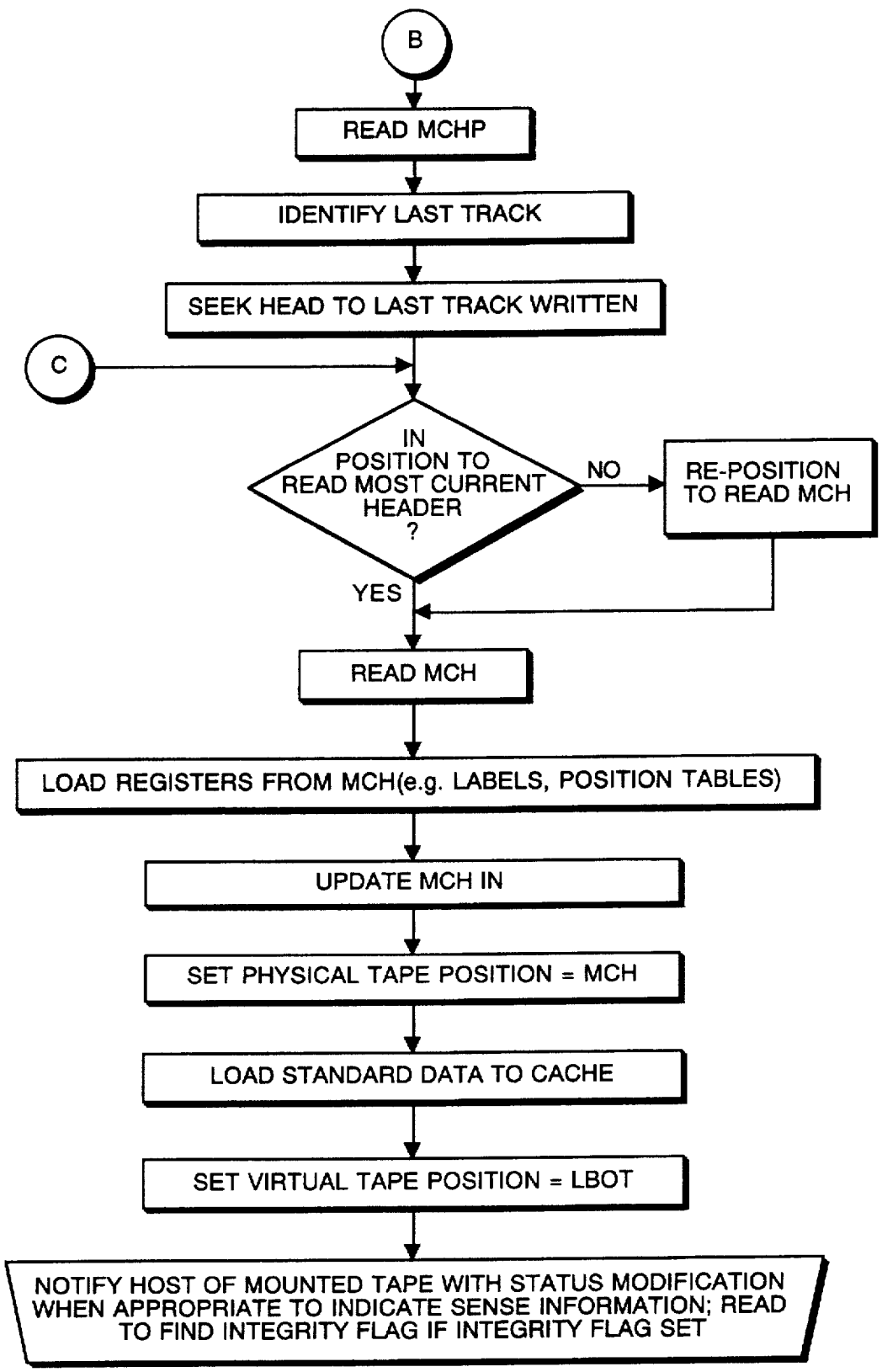
FIG. 8 is a flow chart continuation of the local media initialization routine as shown in FIG. 6.

Referring to FIG. 8, the initialization routine is continued. Once the Most Current Header is found, several actions are taken to initialize the host computer interface. Following the loading of the Most Current Header information necessary to continue recording or retrieval operations, in order to take advantage of the Virtual Tape methodology, both physical tape position as identified from the Most Current Header address and Virtual Tape position are loaded. Virtual Tape position is later used in routines to emulate physical motion that has been made unnecessary by mid-tape unloading and by recording data in localized, identifiable GAU packets rather than serially along the medium. Once the initialization routine is completed, the host computer is notified that the tape drive is ready for operation.

Figure 10:
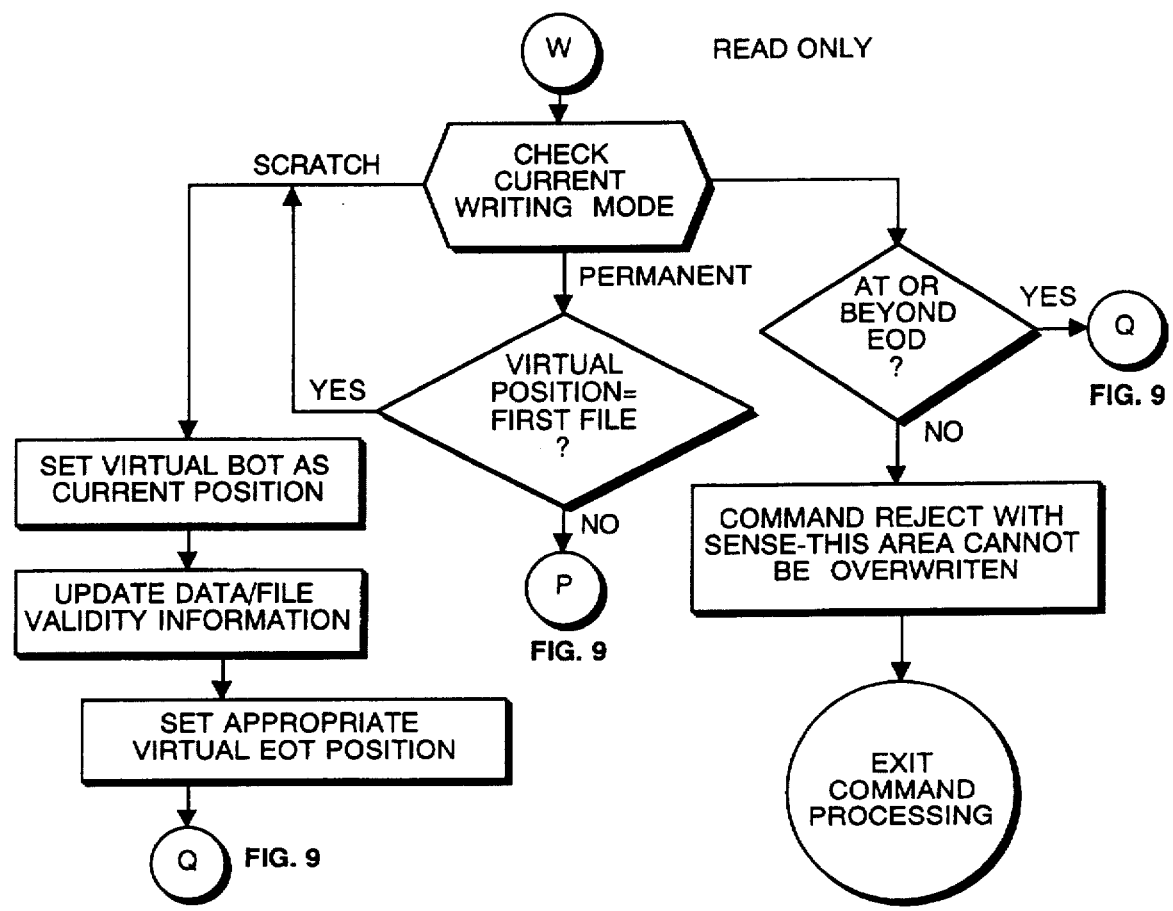
FIG. 10, is a flow chart of the write data routine of the method of the present invention as shown in FIG. 2.

Turning to FIG. 10, including TABLE 6, FIG. 10A, data transfer operations are performed in two modes, referred to as Emulation Mode and Native Mode.

In the Emulation Mode, virtual positioning is used to emulate actual medium motion that is required in other industry data recording standards. In other words, the system translates commands or command sets of such systems into virtual motion and physical motion is only required to position the medium appropriately to execute WRITE, READ or UNLOAD command conditions.

For example, tape drives which use the IBM 3480/3490 half-inch tape cartridge (single reel with extractable leader block), have a known command set. That command set is mapped to provide translation rules to convert the 3480/3490E commands into Native Mode operations. As a simple example, a 3480/3490E command set might be:

| COMMAND | ACTION |
| --- | --- |
| Forward space file | Moves head from BOT to beginning of file 2 |
| Forward space file | Moves head from file 2 to beginning of file 3 |
| Back space block | Moves the head to the end of file 2 |
| Write | Appends to file 2. |

Assume that file 2 is the last Valid file on a Virtual Volume in accordance with the present invention. The MCHP/CHP will direct loading of the emulated tape to the position of the tape mark, EOD, that ended file 2. The two "Forward space file" commands would update the Virtual Tape position from virtual BOT (assumed because of 3480/3490E emulation of loading a cartridge that initially positions at PBOT for the cartridge) to move first to the end of file 1 (the beginning of file 2) and then to the end of file 2. At this point, the Virtual Tape position and the physical tape position are similar, that is, in the vicinity of the final tape mark, and no physical tape motion has yet been required. The "Back space block" command further updates the virtual position. When the "Write" command is received, the tape is then physically positioned to overwrite the tape mark and the EOD marker with more data blocks being added to the file.

Figure 9:
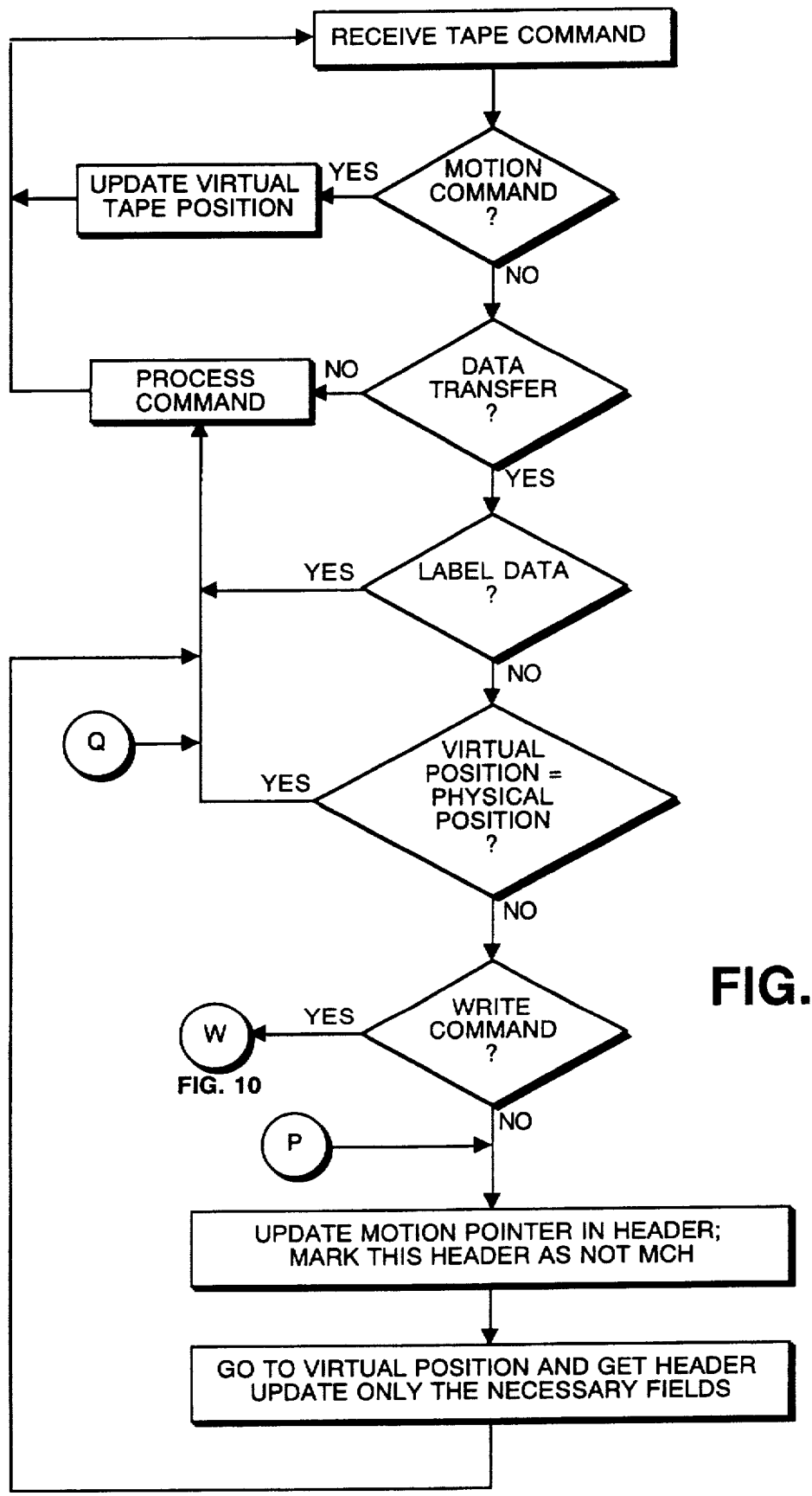
FIG. 9 is a flow chart of the virtual media positioning routine of the method of the present invention as shown in FIG. 1A.

The process of finishing initialization and setting up for virtual positioning is shown in FIG. 9. For each of the actual tape motion commands (for example, SEARCH BLOCK ID, SPACE BLOCK, SPACE FILE commands are common to most data recording systems), the motion that is commanded will be noted in the Virtual Tape position code field of the appropriate header. The Most Current Header is accessed to find the position of the indicator appropriate to the command. The Virtual Tape position data is updated accordingly to reflect the requisite command being satisfied and the host computer is notified that the command has been executed and the drive is ready for the next command.

Note that for tape motion commands involving a READ DATA function (other than reading a Label which will be found in the Current Header) or a WRITE DATA function (for example, READ BLOCK, READ BACKWARD BLOCK, WRITE BLOCK, WRITE TAPE MARK), the physical position is made equal to the virtual position by marking the Most Current Header as no longer being the Most Current Header (for example, by removing a predetermined flag bit or byte of the header) and a motion pointer replaces the MCH pointer. The tape is physically moved to the required position to execute the command (for example, the next available section marker). A new header as a new Most Current Header is written (or if necessary, a prior header is written over) as the READ or WRITE command is executed. Thus, a command which to this point has called for only virtual motion is converted to actual motion.

Referring back now to FIG. 10, the WRITE DATA mode is assessed.

Native Write Mode processes are designated into three submode categories:

Read Only Data—that is, data which host system processes have recorded as a permanent (e.g., archival records); once written, this data can be appended to, but may not be overwritten until the entire tape is specifically reorganized by use of predetermined Native Write Mode commands; in the Read Only Data Mode, a header field designates the specific data blocks between the VBOT/VEOT markers of that Virtual Volume as a "read only" file set, preventing any writing operations on that section of tape, either intentionally or inadvertently, for example, within an archived $GAU_i$ that is less than a complete Virtual Volume;

Permanent Data—that is, data which is designated such that the host must specifically send a command to overwrite it; Native Write Mode commands to overwrite any such data block will be allowed; and Scratch Data—that is, data which is recorded as temporary (e.g., a periodic, chronological, recovery backup tape), but has no long term usefulness and so may be recorded over. This mode allows the VBOT1 to be reset each time the tape is loaded and further allows the $VEOT_i$ to float forward when the tape is full, such that the $VEOT_i/VBOT_i$ pair is always the next $GAU_i$ to be used.

In the Scratch Data Mode, recording processes are optimized. For example, using the HALF WIDTH WRITE MODE, the tape operates as an endless loop. Simple identification of the next $GAU_i$ to be used (e.g., in FIG. 5 section b5 following the MCH pointer) is all that is required before transferring data to the medium. The header field designations for Valid/Invalid Data are automatically set. As the tape comes full circle to VBOT1, since the tape is a Native Mode Scratch Data tape, the data block following VBOT1 may be written over without a pause for user intervention. Generally, the Scratch Data Mode is an appropriate default mode, allowing the recording operations to proceed with the least user intervention requirements, that is, the recording medium is considered to be "Scratch Data" unless otherwise designated.

All data between an $VBOT_i$ marker and an EODi is considered Valid Data. All data between an EODi marker and a VEOT marker is considered Not Valid Data (that is, it can be overwritten). Those collections of data blocks that have not been partially overwritten yet maintain their integrity (that is, can still be recovered), which is noted by an appropriate code in a predetermined header field. Therefore, there is (1) Valid Data with integrity, (2) Valid Data with lost integrity, (3) Not Valid Data with integrity, and (4) Not Valid Data with lost integrity. There are several WRITE DATA options that will affect the number and placement of files and Virtual Volumes on the tape.

First, as described above, the Virtual Volume may be defined for "Scratch Data" writing (that is, data which is recorded as a temporary chronological backup but has no long term usefulness so may be recorded over later) either directly in a Native Mode set or indirectly by writing to the beginning of the first file, that is, begin writing where currently positioned. All data currently on the Virtual Volume is designated as Not Valid with selected integrity indicators. The $VBOT_i$ marker is repositioned to the next $GAU_i$ in the Virtual Volume current Logical Recording Domain (that is, between $LBOT_i$ and $LEOT_i$). Integrity will be lost for the data being overwritten in the current $GAU_1$. Furthermore, if Scratch Data writing is indicated by a Native Mode command set, when the tape is full, writing continues as if an endless loop tape were in use, moving $VBOT_i$ forward accordingly.

Second, the Recording Domain may be defined for "Reorganization,", for example by a Native Mode Reorganize command. This means that a new predetermined MEDIA STRUCTURE definition for the physical Volume is directed with a default being to record one Virtual Volume on the medium in a Permanent, HALF WIDTH WRITE MODE, placing VBOT1 in the next GAU in the direction of PEOT from the current physical position, with all data on medium marked Not Valid, with appropriate integrity indicators.

A third instance is a Valid Data sequence of commands that designates a specific set of data blocks or a file to be overwritten. Data already on the tape, if any, is overwritten at the physical position corresponding to the virtual position indicated. Data integrity indicators are updated appropriately.

After appropriate positioning, if the Virtual Volume is filled and the Native Write Mode is Permanent, a consideration as to whether to enter the Reorganize mode is provided. Otherwise, the host is notified that the medium is full. The host can then instruct to overwrite data by issuing a backspace or rewind command followed by a WRITE command. The subsystem will reposition the tape as directed and allow a write-over of a previously recorded data.

However, with the possibility of very lengthy headers as noted above, further flexibility of the present invention will be recognized in that mixed mode operations can be incorporated into a single media by including all three Modes, Read Only, Permanent and Scratch, in different areas of the Logical Recording Domain with appropriate directory information in the headers and by providing the user with a designation option at the time of recording initialization or through the Reorganize command set.

As a collection of data blocks is overwritten, the header directory is amended to designate the collection of blocks as only partially recoverable to the extent that any part of the overwritten collection of blocks remains once writing of the current data blocks terminates. Once the collection of blocks is completely overwritten, its label is removed from the directory field of the header. In sum, in writing the Most Current Header, the system maintains a list of data blocks (and lists of files) and higher level GAU's and a designation as to whether each is valid, invalid but recoverable (has integrity), or invalid but partially recoverable (lost integrity).

The Reorganize Data Mode is provided to allow the end user to reclassify data between the Valid and Invalid categories and to restructure the hierarchy of $GAU_i$ employed on the media. As the header contains a directory of the tape, including defined sets of LBOT/LEOT and VBOT/VEOT pairs (each with its own specific headers and specifically addressable allocation units) and other larger and smaller GAU units, at any time during initialization or processing it is possible to allow the user to make changes to the logical organization of a medium. For example, a tape being used in the HALF WIDTH WRITE MODE may have been defined to have twenty LBOT/LEOT and VBOT/VEOT pairs in its recording domain; the user might designate ten already used as Read Only and the remaining ten to be used as Scratch Volumes.

Turning now to FIG. 5A–E, five organizational MEDIA STRUCTURES, using the Native Mode examples are depicted. Note that in the method of the present invention the VBOT/VEOT marker pair can be positioned anywhere within the bounds of the LBOT/LEOT marker pair.

Figure 5A:
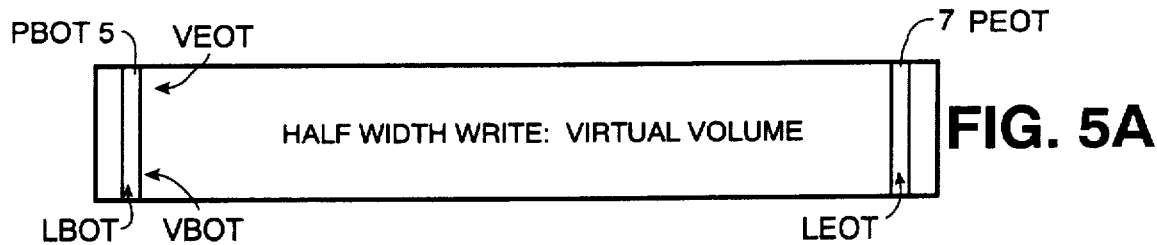
Figure 5B:
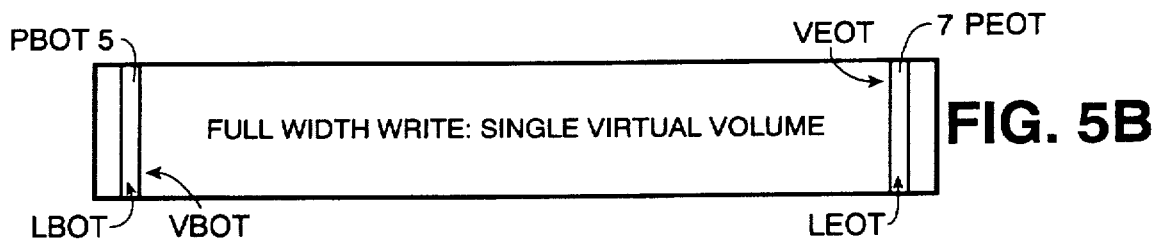
Figure 5C:
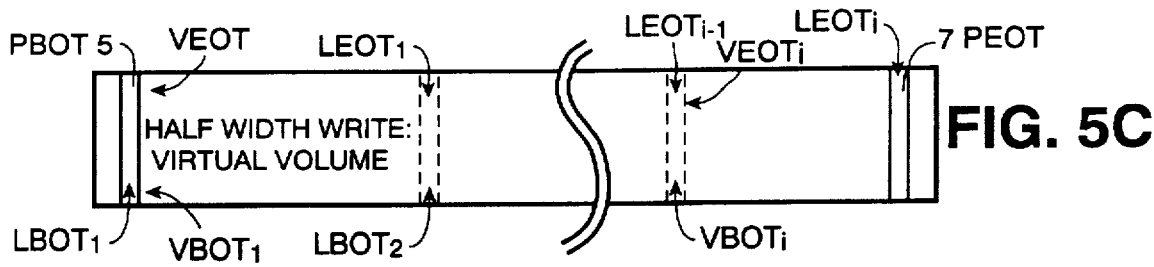
Figure 5D:
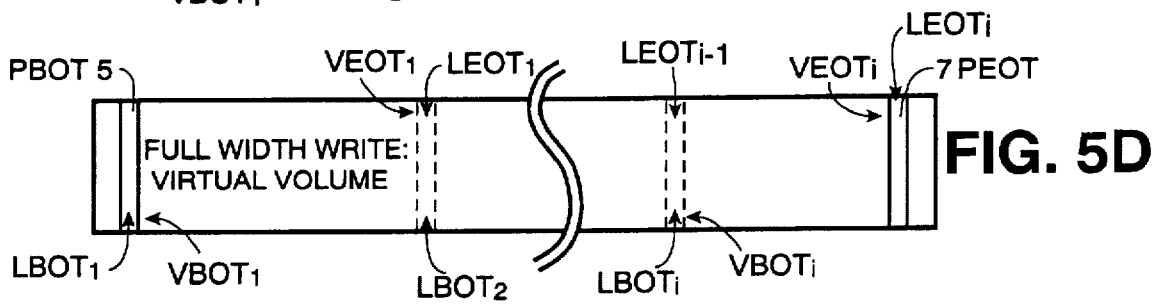
Figure 5E:
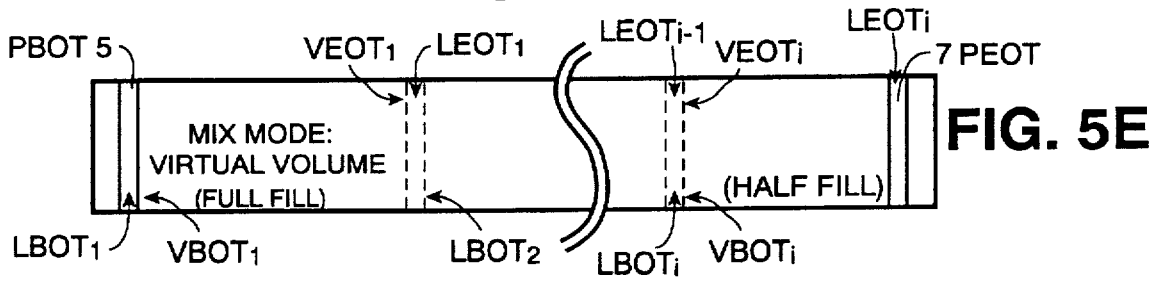

In FIG. 5A, using the HALF WIDTH WRITE MODE, a single Virtual Volume recorded from LBOT will place the VEOT immediately superjacent the LBOT marker. Each half of the tape will contain plural serpentine files in each section as designated by the user. In FIG. 5B, using the FULL WIDTH WRITE MODE, a single Virtual Volume recorded from LBOT will place the VEOT at the LEOT marker. In FIG. 5C, using the HALF WIDTH WRITE MODE, "i" number of Virtual Volumes are recorded. In FIG. 5D, using the FULL WIDTH WRITE MODE, "i" number of Virtual Volumes are recorded. In FIG. 5E, "i" number of Virtual Volumes are recorded mixing the WRITE MODES (note that in mixing modes, "i" is greater than or equal to one).

Figure 5F:
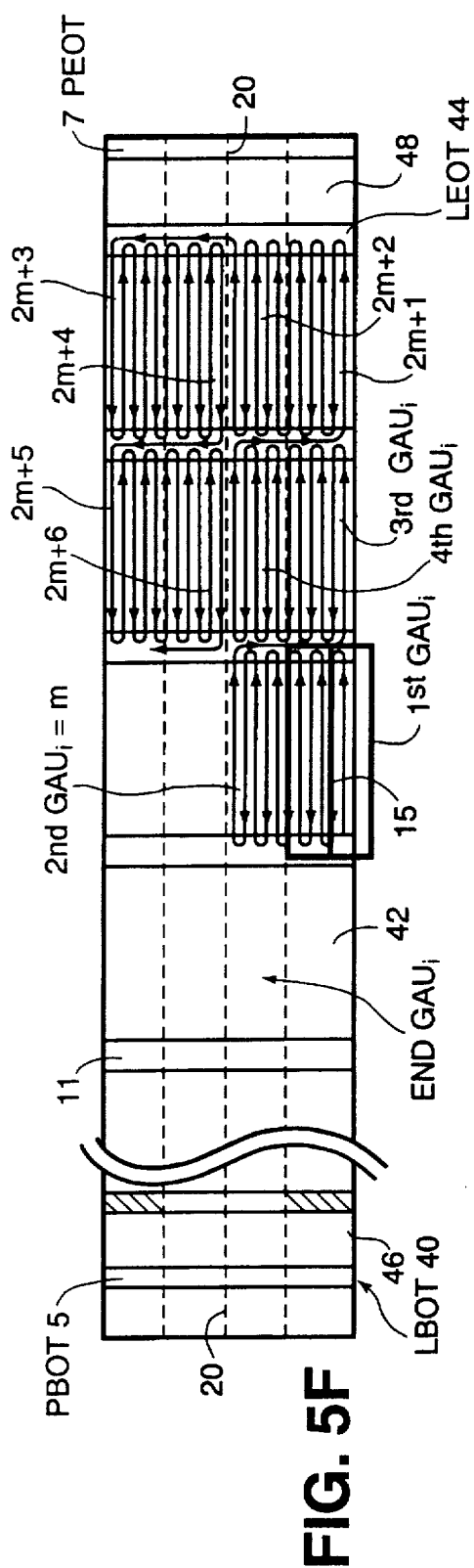
FIG. 5F is a more detailed depiction of the exemplary embodiment of the present invention as shown in FIG. 5A in a partially written state.

FIG. 5F is a more detailed depiction of the exemplary embodiment of the present invention as shown in FIG. 5A in a partially written state (servo tracks not shown). The LBOT 40 marker is the first segment marker of the first $GAU_i$ on the tape following (or coincident with) PBOT 5 which designates the beginning of the recording domain. An optional gap 46 in the recording domain has been left between PBOT 5 and LBOT 40 for recording subsystem information. With the head parked at a rest position 42, the HALF WIDTH WRITE MODE begins in the "1st GAU." VBOT is designated as beginning with the 1st GAU. Serpentine tracks 13 are laid down and headers written in the order of 1st GAU, 2nd GAU="m", 3rd GAU, 4th GAU, 2m+1 GAU, 2m+2 GAU, 2m∓GAU, 2m+4 GAU, 2m+5 GAU, 2m+6 GAU, etc. Note the reflection point, that is where the tape direction reverses and the data begins to be written on the top half of the tape in 2m∓GAU. Another optional recording domain gap 48 has been set aside for subsystem information between the last segment marker in the Logical Recording Domain and the PEOT marker 7. A similar refection will occur when data has filled the last, top half GAU adjacent LBOT marker 40 and writing will resume on the bottom half of the tape until the "END GAU" has been completed. VEOT is designated within the END GAU.

Figure 11:
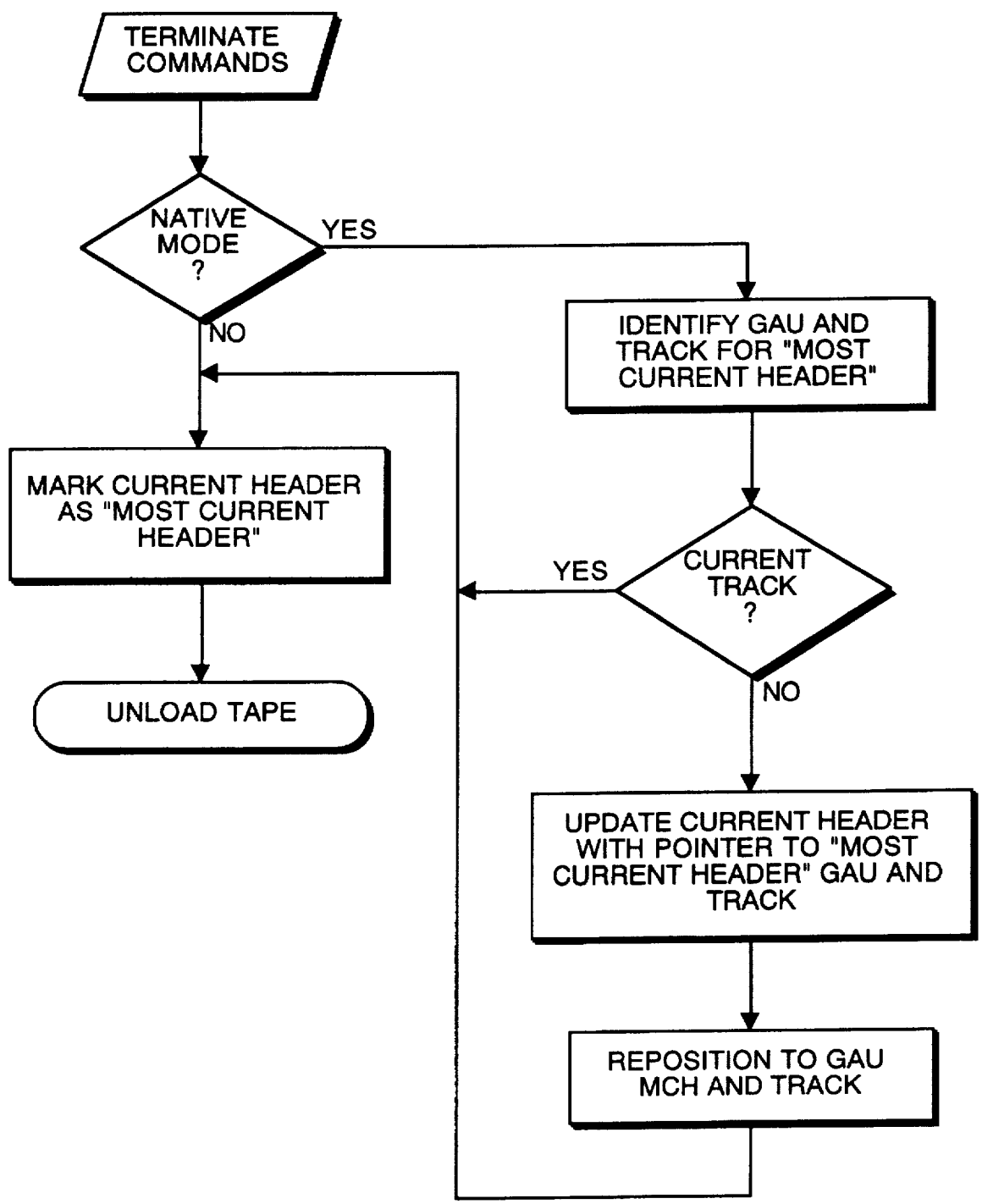
FIG. 11 is a flow chart of the termination routine of the method of the present invention as shown in FIG. 2.

Referring to FIG. 11, the routine for termination of operations in accordance with the present invention is diagrammed. An advantage of using a self-contained, two-reel cassette is the ability to load and unload a tape at any point along its longitudinal length. In unloading, primary to the method is the designation of the current header as the Most Current Header and writing the MCH pointer before extracting the tape from the drive mechanism.

A determination is made as to whether the current operation, generally a WRITE MODE routine, is in the Native Mode or the Emulation Mode.

If the Emulation Mode has been employed, the current header is designated as a Most Current Header and the pointer field is designated as a Most Current Header pointer, that is, directing to the Most Current Header. The typical "rewind and unload" command, such as may be used in a QIC command set being emulated, is translated into UNLOAD since in the present invention aspect of virtual positioning the rewinding to PBOT is unnecessary.

If the Native Mode has been employed, from the current header data, the GAU and track to be designated with the Most Current Header and Most Current Header pointer is identified. Repositioning occurs if the current position is not appropriate before updating the header data and unloading the media.

Figure 12:
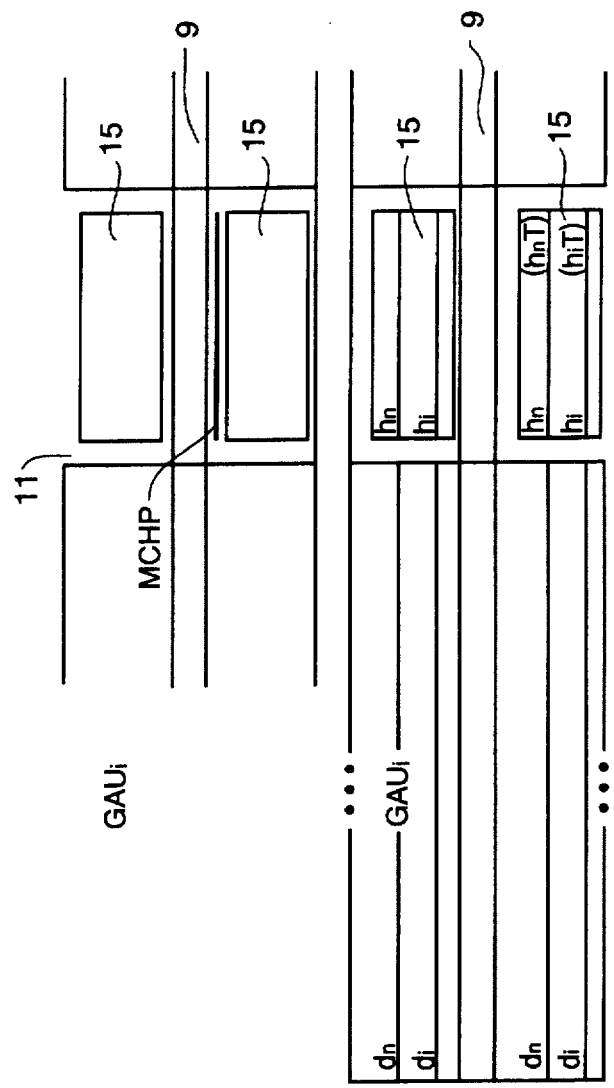
FIG. 12 is a schematic drawing of a length of tape depicting alternative embodiment vertical headers in accordance with the present invention as shown in FIG. 3.

While the present invention has been disclosed in a preferred embodiment using longitudinal headers, vertical headers may be optionally positioned between head positioning gaps, or markers, as demonstrated in FIG. 12. For example, header "hi" would contain header information associated with the data block in data track "di," terminating at "hiT."

As set forth above, it will be recognized by those skilled in the art that the recording method of the present invention provides a flexible logical control process which substantially reduces physical motion, and therefore wear and tear on recording mechanisms through the use of recording rules and controls, such as the detailed header and pointer cataloging mechanism described, to identify data blocks recorded on a medium. Serpentine recording in sections of medium substantially shorter than the full recording domain available with the provision of the header data tracking facility allows a localization of the data physically on the medium not achieved in the prior art.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application to thereby enable others skilled in the art to understand the invention for various embodiments and with various modifications as are suited to the particular use contemplated, such as for media other than magnetic tape to which this control logic process for recording is readily adaptable. It is intended that the scope of the invention be defined by the claims appended hereto and their equivalents.

What is claimed is:

1. A data storage method for linearly recording data blocks on a physical recording medium, having at least one data recording domain having a predetermined cross-width dimension and a longitudinal length dimension, said method comprising:

a. demarcating said domain into "a" number of longitudinal segments, where "a" is an integer greater than 1;

b. partitioning each said longitudinal segment across said cross-width dimension of said recording domain into "b" number of cross-width segments, where "b" is an integer greater than or equal to 1, each said cross-width segment having "c" number of parallel recording tracks, where "c" is an integer greater than or equal to 1; and c. recording, beginning at any position within said recording domain, a collection of related data blocks on said recording tracks within a sequence of one or more allocation units, such that each said collection of related data blocks defines a virtual medium, and each physical medium comprises "d" number of virtual media, where "d" is an integer greater than or equal to one.

2. The method as set forth in claim 1, further comprising:

repeating step c. by sequentially recording collections of data blocks downstream of each previously recorded collection of data blocks.

3. The method as set forth in claim 2, further comprising:

following step b., designating "e" number of segments, where "e" is an integer greater or equal to one, as a section for recording a collection of data blocks.

4. The method as set forth in claim 3, said step of designating sections further comprising:

designating each said section with a pair of predetermined marker symbols defining a beginning of each said virtual media and an end of each said virtual media, such that "d" equals the number of said pairs of predetermined marker symbols.

5. The method as set forth in claim 4, wherein said step of recording further comprises:

simultaneously parallel recording on "f" number of tracks within an allocation unit, where "f" is an integer greater than one and less than "c."

6. The method as set forth in claim 1, further comprising:

following step b., marking said recording domain into multiple segment, multiple allocation unit sections with index markers designating a logical beginning of medium towards a physical end of medium from a segment marker at the start of said section and logical end of medium towards a physical beginning of medium from a segment marker at the end of said section.

7. The method as set forth in claim 6, wherein said step of marking said recording domain further comprises:

enabling a pair of virtual beginning of medium and virtual end of medium markers to float within the bounds of a logical beginning of medium and logical end of medium markers.

8. The method as set forth in claim 1, wherein said step of demarcating said segments further comprises:

writing at least one header track the entire longitudinal length of said domain, and writing segment markers at predetermined, equal spacing within said header.

9. The method as set forth in claim 1, wherein said step of demarting said segments further comprises:

writing at least one read/write head positioning reference track the entire longitudinal length of said domain, including writing at least one header track the entire longitudinal length of said domain, with segment markers at predetermined, equal spacing within said header.

10. The method as set forth in claim 1, wherein said step of partitioning further comprises:

defining at least one servo track that divides said cross-width dimension of said domain.

11. The method as set forth in claim 1, wherein said step of recording further comprises:

recording contiguous allocation units across the full cross-width of said domain.

12. The method as set forth in claim 1, wherein said step of recording further comprises:

serpentine recording contiguous allocation units in a first longitudinal medium motion direction across one-half the full cross-width of said domain, reversing said direction, and serpentine recording in said reverse direction contiguous allocation units across the other one-half the full cross-width of said domain.

13. The method as set forth in claim 1, further comprising:

translating predetermined commands for actual motion into predetermined commands for virtual motion such that actual motion is required substantially only for reading data, writing data, and moving to a specific location for a termination sequence of said method.

14. In a tape drive apparatus, having a read-write recording head means, a tape transport means, and an interface means for connecting said tape drive apparatus to a host computer, a method of recording and retrieving data blocks on a tape adapted to be compatible with said tape transport means, said tape having a recordable recording domain having a predetermined longitudinal length from end-to-end and a predetermined cross-width from edge-to-edge, said method comprising:

a. demarcating said recording domain into "a" longitudinal data recording segments, where "a" is an integer greater than one, spaced longitudinally along the entire length of said recording domain to define segments of said domain;

b. demarcating said tape across said recording domain cross-width into "b" cross-width data segments, where "b" is an integer greater than or equal to one;

c. partitioning said segments into allocation units;

d. writing within an allocation unit an index marker to mark a virtual beginning of tape position within said allocation unit;

e. recording a collection of data blocks received from said host computer via said interface in a sequence of one or more allocation units in a serpentine recording mode following said virtual beginning of tape index marker until said collection of data blocks has been fully recorded;

f. writing a virtual end of tape index marker following said collection of data blocks.

15. The method as set forth in claim 14, further comprising:

repeating steps c., d., and e. until all allocation units have been filled, whereby each tape so recorded defines a number, "d," of Virtual Tape Volumes, where "d" equals the number of collections of data blocks bounded by a virtual beginning of tape index marker and a virtual end of tape index marker.

16. The method as set forth in claim 14, wherein said step of demarcating segments further comprises:

writing at least one primary header track the full length of said domain, said header track including segment markers.

17. The method as set forth in claim 14, wherein said step of demarcating said cross-width segments further comprises:

writing at least one read/write head positioning reference track the entire longitudinal length of said domain, including writing at least one header track the entire longitudinal length of said domain, with segment markers at predetermined, equal spacing within said header.

18. The method as set forth in claim 14, wherein said step of writing at least one primary header track further comprises:

recording data fields having predetermined codes therein indicative of tape management system information and controls.

19. The method as set forth in claim 14, wherein said step of demarcating said cross-width data recording segments further comprises:

writing multiple servo tracks substantially the full length of said recording domain.

20. The method as set forth in claim 14, wherein said step of serpentine recording of data blocks further comprises:

simultaneously recording parallel tracks of data such that the number of tracks simultaneously recorded is less than the total number of data tracks available for recording in an allocation unit.

21. The method as set forth in claim 16, wherein said step of serpentine recording of data blocks further comprises:

recording over at least a portion of said primary header track as a current header track, having data fields for predetermined codes for tape management system information and controls.

22. The method as set forth in claim 21, wherein said step of recording a current header track, includes recording at least one of said data fields as a pointer code.

23. The method as set forth in claim 22, further comprising:

terminating said step of recording by writing a predetermined code in said header to designate said header track as a most current header, including a pointer code identifying the location of said most current header track.

24. The method as set forth in claim 23, prior to said step of serpentine recording a data block, further comprising:

prior to said step of writing data on said parallel tracks, searching said header tracks for said pointer code for said current header track.

25. The method as set forth in claim 14, further comprising:

translating predetermined commands for tape physical motion into predetermined commands for virtual motion such that physical tape motion is required substantially only for reading data, writing data, and moving to a specific location for termination of said method.

26. A computer peripheral apparatus for storage of data on and retrieval of data from a recording medium, said apparatus having a movable read-write recording head means, a means for positioning said head means to a desired location on said medium, a recording medium transport means for moving said recording medium across aid head means, and an interface means for coupling said apparatus to a host computer, said apparatus comprising:

a. means, coupled to said interface means, for controlling said head means to read and write predetermined timing markers on said media;

b. means, coupled to said interface means, for controlling said head means to read and write markers to partition said media across a full cross-width dimension thereof between said timing markers;

c. means, coupled to said interface means, for controlling said head means to write and read in a serpentine recording method collections of blocks of data on multiple tracks within one or more contiguous partition markers, such that said recording begins at any position on said medium; and d. means, coupled to said interface means, for controlling said head means to record and read a header track for each said partition, containing predetermined codes for apparatus recording management information and controls;

whereby each said partition of medium recorded with each said collection of data block defines a virtual medium, and each physical medium comprises multiple, contiguous virtual media.

27. The apparatus as set forth in claim 26, further comprising:

means, coupled to said interface means, for translating predetermined commands for actual motion of said medium into predetermined commands for virtual motion such that actual motion is required substantially only for reading data, writing data, and moving to a location for termination of operation.

28. The apparatus as set forth in claim 27, wherein each of said means for controlling said head means and said means for translating further comprise a single application specific integrated circuit.

29. A method for recording computer data blocks on a tape in a magnetic tape recording apparatus for storage and retrieval of computer data, having a movable read-write recording head means, a positioning means for locating said head means to a desired position with respect to said tape, a tape transport means for moving a length of tape across said head means, and an interface means for connecting said tape recording apparatus to a host computer, said tape having a recordable recording domain having a predetermined longitudinal length dimension from end-to-end and a predetermined cross-width dimension from edge-to-edge adapted to support multiple parallel recording tracks thereon, said method for recording said computer data comprising:

a. formatting a tape by:
   i. recording for substantially all said longitudinal length of said recording domain to form a location units at least one said track as a primary header track by:
      (1) recording redundant sets of first predetermined, recording method information codes in said primary header track, and
      (2) recording marker codes at regular intervals to demarcate said recording domain into a multiplicity of longitudinal data recording segments, such that each said segment contains at least one set of said recording method information codes; and
   ii. partitioning said recording domain in said cross-width dimension into at least one cross-width data recording segment in each said longitudinal segment by defining at least one servo-track for substantially all said longitudinal length of said recording domain;

b. dividing said longitudinal length of said recording domain into multiple tape sections by recording pairs of predetermined marker codes as logical beginning of tape and logical ending of tape indicators, wherein each said section encompasses at least one said allocation unit;

c. enabling a pair of virtual beginning of tape and virtual end of medium tape markers to float within the bounds of said logical beginning of tape and logical ending of tape markers;

d. recording each of said computer data blocks in a serpentine manner on a multiplicity of tracks between said virtual beginning of tape and virtual end of tape indicators, including:
   i. retaining at least one set of said first, predetermined recording method information codes of sad primary header track;
   ii. recording second, predetermined, recording method information codes representative of management information and controls related to collections of said computer data blocks being currently recorded over a portion of said primary header track not containing said first, predetermined recording method information codes;
   iii. including among said second, predetermined recording method information codes a pointer code indicative of:
      (1) a location on said tape of the next pair of said virtual beginning of tape and virtual end of tape indicators, and
      (2) a location on said tape of said second, predetermined, recording method information codes most recently recorded.

30. The method as set forth in claim 29, further comprising:

repeating step c. until all allocation units have been filled, whereby each tape so recorded defines the number "n" Virtual Tape Volumes, where "n" equals the number of collections of data blocks bounded by a logical beginning of tape indicator and a logical end of tape indicator.

31. The method as set forth in claim 29, wherein said step of partitioning said recording domain in said cross-width dimension further comprises:

partitioning said recording domain into an even number of allocation units.

32. The method as set forth in claim 31, wherein said step of recording each of said computer data blocks further comprises:

recording computer data blocks in serpentine manner on a multiplicity of tracks between said logical beginning of tape and logical end of tape indicators in contiguous allocation units on only a first half of said cross-width dimension until all said allocation units in said one-half of said cross-width dimension have been recorded;

recording in the opposite direction computer data blocks in serpentine manner on a multiplicity of tracks between said logical beginning of tape and logical end of tape indicators in contiguous allocation units on a second half of said cross-width dimension until all said allocation units in said second half of said cross-width dimension have been recorded, whereby the "nth" virtual tape volume recorded is contiguous to the first virtual tape volume recorded.

33. The method as set forth in claim 31, wherein said step of recording each of said computer data blocks further comprises:

recording computer data blocks in serpentine manner on a multiplicity of tracks between said logical beginning of tape and logical end of tape indicators in contiguous allocation units in a serpentine manner such that said recording divides said even number of partitions by a multiple of 2.

34. The method as set forth in claim 29, further comprising:

translating predetermined commands for tape actual motion into predetermined commands for virtual motion such that actual tape motion is required substantially only for reading data, writing data, and moving to a specific location for termination processes of said method.

35. A data storage method for linearly recording data blocks on a physical media, having at least one physical recording domain having at least one logical recording domain, said logical recording domains structured within "n" recording dimensions (where "n"=an integer 1 through "n"), including at least a cross-width dimension and a longitudinal length dimension of said physical recording domain, said method comprising:

a. demarcating said "n" longitudinal dimensions of said logical recording domain into "$a_i$" number of segments (where "i"=an integer 1 through "n"), where "a" is an integer greater than or equal to 1;

b. partitioning said logical recording domain and grouping sets of minimum allocation units comprising "$j_i$" said segments (where "$j_i$" is an integer greater than or equal to one and less than or equal to "$a_i$") across each said "n" dimensions of said logical recording domain into "b" number of group allocation units, where "b" is an integer greater than or equal to 1, each said group allocation unit having "c" number of concurrent recording tracks, where "c" is an integer greater than or equal to 1; and c. recording, beginning at any position within said logical recording domain, a collection of related data blocks on said recording tracks within a sequence of one or more group allocation units, such that each said collection of related data blocks defines a subset of a virtual media, and each physical media comprises "d" number of virtual media, where "d" is an integer greater than or equal to one.

36. The method as set forth in claim 35, wherein said step of recording further comprises:

concurrently recording parallel tracks within an allocation unit.

37. The method as set forth in claim 35, wherein said step of recording further comprises:

concurrently recording said tracks within more than one allocation unit.

38. The method as set forth in claim 35, wherein said step of concurrently recording parallel tracks further comprises:

serpentine recording said tracks within each said allocation unit.

39. The method as set forth in claim 35, wherein said step of partitioning and grouping further comprises:

designating at least one predetermined group of sets as a single superset.

40. The method as set forth in claim 39, wherein said step recording further comprises:

writing at least a first data block of said collection of data blocks in an allocation unit immediately downstream of an allocation unit boundary demarcation.

41. The method as set forth in claim 40, wherein said step of writing further comprises:

writing data blocks subsequent to said first data block sequentially in contiguous allocation units in a subset of said "n" dimensions.

42. A data storage method for linearly recording data blocks in discrete tracks on a physical media, having at least one data recording domain structured into a predetermined number "n" recording dimensions, RDn (where "n" is an integer 1 through "n") including at least a predetermined cross-width dimension and a longitudinal length dimension, said method comprising:

recording, beginning at any position within said recording domain, a block of data on said tracks in a hierarchy of groups of minimum allocation units ($GAU_i$) defined by the form:

$$GAU_i = SG_{g1} + SG_{gk} + \ldots SG_{gn},$$

where:

$SG_{gk}$=segment grouping in a "k" dimension at level "$g_k$";

k=1 through n;

n=RDn;

each $g_k$ is greater than or equal to zero;

the maximum of $g_k$=i;

and for each possible i, $$GAU_i = SG_{g1} + SG_{g2} + \ldots SG_{gn};$$

and $$GAU_{i+1} = SG_{g1} + SG_{g2} \ldots SG_{gn},$$

where each $g_k$ for $GAU_{i+1}$ is greater than or equal to $g_k$ for $GAU_i$;

at least one $g_k$ for $GAU_{i+1}$ is one greater than $g_k$ for $GAU_i$; and the maximum $g_k$ for $GAU_{i+1}$=i+1; and, where $$GAU_i = SG_{g1} + SG_{g2} + \ldots SG_{gn} \text{ and,}$$

$$GAU_i' = SG_{g1} + SG_{gk} + \ldots SG_{gn},$$

where $g_k$ for $GAU_i'$ are simply not all equal to $g_k$ for $GAU_i$, and the maximum $g_k$ for $GAU_i$=the maximum $g_k$ for $GAU_i'$=i, and wherein segment grouping levels are defined as:

$g_1 \ldots g_n > g_k$

=0 for basic segmentation, no groupings;
=1 for groups of segments;
=2 for groups of groups of segments;
=>2 for groups of groups of groups of segments.

43. A recording medium having a format having at least one logical recording domain structured into a predetermined number "n" recording dimensions, RDn (where "n" is an integer 1 through "n") including at least a predetermined cross-width dimension and a longitudinal length dimension, said format comprising:

a. first index markers recorded in said medium demarcating "n" longitudinal dimensions of said logical recording domain into "$a_i$" number of segments (where "i"= an integer 1 through "n"), where "a" is an integer greater than or equal to 1;

b. second index markers recorded in said medium partitioning said logical recording domain and grouping sets of allocation units comprising "$j_i$" said segments (where "$j_i$" is an integer greater than or equal to one and less than or equal to "$a_i$") across each said "n" dimensions of said logical recording domain into "b" number of group allocation units, where "b" is an integer greater than or equal to 1, each said group allocation unit having "c" number of concurrent recording tracks, where "c" is an integer greater than or equal to 1; and c. data recording domains, bounded by said first and second index markers, for recording, beginning at any position within said logical recording domain, a collection of related data blocks on said recording tracks within a sequence of one or more group allocation units, such that each said collection of related data blocks defines a subset of a virtual media, and each physical media comprises "d" number of virtual media, where "d" is an integer greater than or equal to one.

* * * * *